United States Patent
Pinskiy et al.

(10) Patent No.: US 12,447,687 B2
(45) Date of Patent: Oct. 21, 2025

(54) SYSTEMS, METHODS, AND MEDIA FOR ARTIFICIAL INTELLIGENCE PROCESS CONTROL IN ADDITIVE MANUFACTURING

(71) Applicant: Nanotronics Imaging, Inc., Cuyahoga Falls, OH (US)

(72) Inventors: Vadim Pinskiy, Wayne, NJ (US); Matthew C. Putman, Brooklyn, NY (US); Damas Limoge, Brooklyn, NY (US); Aswin Raghav Nirmaleswaran, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 175 days.

(21) Appl. No.: 18/452,914

(22) Filed: Aug. 21, 2023

(65) Prior Publication Data
US 2023/0391016 A1 Dec. 7, 2023

Related U.S. Application Data

(63) Continuation of application No. 17/444,619, filed on Aug. 6, 2021, now Pat. No. 11,731,368, which is a
(Continued)

(51) Int. Cl.
*B29C 64/393* (2017.01)
*B22F 10/30* (2021.01)
(Continued)

(52) U.S. Cl.
CPC ............ *B29C 64/393* (2017.08); *B22F 10/30* (2021.01); *B22F 10/85* (2021.01); *B22F 12/90* (2021.01);
(Continued)

(58) Field of Classification Search
None
See application file for complete search history.

(56) References Cited

U.S. PATENT DOCUMENTS

| 4,433,385 A | 2/1984 | De Gasperi et al. |
| 5,027,295 A | 6/1991 | Yotsuya |

(Continued)

FOREIGN PATENT DOCUMENTS

| AU | 7343900 A | 4/2001 |
| AU | 2002359881 A1 | 7/2003 |

(Continued)

OTHER PUBLICATIONS

Amorn P.S., et al., "Multifab: a Machine Vision Assisted Platform for Multi-material 3D Printing," ACM Transactions on Graphics, Aug. 2015, vol. 34, No. 4, pp. 1-11.
(Continued)

*Primary Examiner* — Carlos R Ortiz Rodriguez
(74) *Attorney, Agent, or Firm* — DLA Piper LLP (US)

(57) ABSTRACT

Systems, methods, and media for additive manufacturing are provided. In some embodiments, an additive manufacturing system comprises: a hardware processor that is configured to: receive a captured image; apply a trained failure classifier to a low-resolution version of the captured image; determine that a non-recoverable failure is not present in the printed layer of the object; generate a cropped version of the low-resolution version of the captured image; apply a trained binary error classifier to the cropped version of the low-resolution version of the captured image; determine that an error is present in the printed layer of the object; apply a trained extrusion classifier to the captured image, wherein the trained extrusion classifier generates an extrusion quality
(Continued)

score; and adjust a value of a parameter of the print head based on the extrusion quality score to print a subsequent layer of the printed object.

20 Claims, 14 Drawing Sheets

Related U.S. Application Data continuation of application No. 16/853,640, filed on Apr. 20, 2020, now Pat. No. 11,084,225, which is a continuation-in-part of application No. 16/723,212, filed on Dec. 20, 2019, now Pat. No. 11,097,490, which is a continuation of application No. PCT/US2019/024795, filed on Mar. 29, 2019, and a continuation of application No. 15/943,442, filed on Apr. 2, 2018, now Pat. No. 10,518,480.

(60) Provisional application No. 62/836,199, filed on Apr. 19, 2019, provisional application No. 62/836,202, filed on Apr. 19, 2019, provisional application No. 62/836,213, filed on Apr. 19, 2019, provisional application No. 62/898,535, filed on Sep. 10, 2019.

(51) Int. Cl.
  *B22F 10/85* (2021.01)
  *B22F 12/90* (2021.01)
  *B29C 64/209* (2017.01)
  *B33Y 10/00* (2015.01)
  *B33Y 50/02* (2015.01)
  *G06F 18/20* (2023.01)
  *G06F 18/2411* (2023.01)
  *G06N 3/04* (2023.01)
  *G06V 10/764* (2022.01)
  *G06V 10/82* (2022.01)
  *G06V 10/98* (2022.01)
  *B22F 10/12* (2021.01)
  *B22F 10/18* (2021.01)
  *B22F 10/25* (2021.01)
  *B22F 10/28* (2021.01)

(52) U.S. Cl.
  CPC .......... *B29C 64/209* (2017.08); *B33Y 10/00* (2014.12); *B33Y 50/02* (2014.12); *G06F 18/2411* (2023.01); *G06F 18/295* (2023.01); *G06N 3/04* (2013.01); *G06V 10/764* (2022.01); *G06V 10/82* (2022.01); *G06V 10/993* (2022.01); *B22F 10/12* (2021.01); *B22F 10/18* (2021.01); *B22F 10/25* (2021.01); *B22F 10/28* (2021.01)

(56) References Cited

U.S. PATENT DOCUMENTS

| | | | |
|---|---|---|---|
| 5,815,198 | A | 9/1998 | Vachtsevanos et al. |
| 6,266,436 | B1 | 7/2001 | Bett et al. |
| 7,853,351 | B2 | 12/2010 | Corey |
| 8,185,217 | B2 | 5/2012 | Thiele |
| 8,612,043 | B2 | 12/2013 | Moyne et al. |
| 8,909,926 | B2 | 12/2014 | Brandt et al. |
| 9,280,308 | B2 | 3/2016 | Kobayashi |
| 9,656,429 | B1 | 5/2017 | Mantha et al. |
| 9,724,876 | B2 | 8/2017 | Cheverton et al. |
| 9,747,394 | B2 | 8/2017 | Nelaturi et al. |
| 9,767,226 | B2 | 9/2017 | Chen et al. |
| 9,855,698 | B2 | 1/2018 | Perez et al. |
| 9,945,264 | B2 | 4/2018 | Wichmann et al. |
| 10,252,466 | B2 | 4/2019 | Ramos et al. |
| 10,481,579 | B1 | 11/2019 | Putman et al. |
| 2003/0061004 | A1 | 3/2003 | Discenzo |
| 2004/0070509 | A1 | 4/2004 | Grace et al. |
| 2004/0173946 | A1 | 9/2004 | Pfeifer et al. |
| 2005/0031186 | A1 | 2/2005 | Luu et al. |
| 2007/0177787 | A1 | 8/2007 | Maeda et al. |
| 2008/0056582 | A1 | 3/2008 | Funayama |
| 2008/0091295 | A1 | 4/2008 | Corey |
| 2009/0198464 | A1 | 8/2009 | Clarke et al. |
| 2014/0034214 | A1 | 2/2014 | Boyer et al. |
| 2014/0035182 | A1 | 2/2014 | Boyer et al. |
| 2014/0036034 | A1 | 2/2014 | Boyer et al. |
| 2014/0036035 | A1 | 2/2014 | Buser et al. |
| 2014/0039659 | A1 | 2/2014 | Boyer et al. |
| 2014/0039662 | A1 | 2/2014 | Boyer et al. |
| 2014/0039663 | A1 | 2/2014 | Boyer et al. |
| 2014/0247347 | A1 | 9/2014 | McNeill et al. |
| 2014/0301179 | A1 | 10/2014 | Rich et al. |
| 2014/0324204 | A1 | 10/2014 | Vidimce et al. |
| 2015/0009301 | A1 | 1/2015 | Ribnick et al. |
| 2015/0009308 | A1 | 1/2015 | Chiba |
| 2015/0045928 | A1 | 2/2015 | Perez et al. |
| 2015/0066440 | A1 | 3/2015 | Chen et al. |
| 2015/0165683 | A1 | 6/2015 | Cheverton et al. |
| 2015/0177158 | A1 | 6/2015 | Cheverton |
| 2016/0023403 | A1 | 1/2016 | Ramos et al. |
| 2016/0096318 | A1 | 4/2016 | Bickel et al. |
| 2016/0164238 | A1 | 6/2016 | Hobson |
| 2016/0167306 | A1 | 6/2016 | Vidimce et al. |
| 2016/0236414 | A1 | 8/2016 | Reese et al. |
| 2016/0236416 | A1 | 8/2016 | Bheda et al. |
| 2016/0250810 | A1 | 9/2016 | Lynch August et al. |
| 2017/0001379 | A1 | 1/2017 | Long |
| 2017/0050382 | A1 | 2/2017 | Minardi et al. |
| 2017/0056966 | A1 | 3/2017 | Myerberg et al. |
| 2017/0056967 | A1 | 3/2017 | Fulop et al. |
| 2017/0056970 | A1 | 3/2017 | Chin et al. |
| 2017/0102694 | A1 | 4/2017 | Enver et al. |
| 2017/0157831 | A1 | 6/2017 | Mandel et al. |
| 2017/0193680 | A1 | 7/2017 | Zhang et al. |
| 2017/0232515 | A1 | 8/2017 | Demuth et al. |
| 2017/0252815 | A1 | 9/2017 | Fontana et al. |
| 2017/0252816 | A1 | 9/2017 | Shim et al. |
| 2017/0252820 | A1 | 9/2017 | Myerberg et al. |
| 2017/0252821 | A1 | 9/2017 | Sachs et al. |
| 2017/0252822 | A1 | 9/2017 | Sachs et al. |
| 2017/0252823 | A1 | 9/2017 | Sachs et al. |
| 2017/0252824 | A1 | 9/2017 | Gibson et al. |
| 2017/0252825 | A1 | 9/2017 | Fontana et al. |
| 2017/0252826 | A1 | 9/2017 | Sachs et al. |
| 2017/0252827 | A1 | 9/2017 | Sachs et al. |
| 2017/0348906 | A1 | 12/2017 | Nowak et al. |
| 2018/0001565 | A1 | 1/2018 | Hocker |
| 2018/0029300 | A1 | 2/2018 | Batchelder |
| 2018/0036964 | A1 | 2/2018 | Dehghanniri et al. |
| 2018/0056582 | A1 | 3/2018 | Matusik et al. |
| 2018/0079125 | A1 | 3/2018 | Perez et al. |
| 2018/0133970 | A1 | 5/2018 | Boyer et al. |
| 2018/0194066 | A1 | 7/2018 | Ramos et al. |
| 2018/0236541 | A1 | 8/2018 | Holenarasipura Raghu et al. |
| 2018/0253590 | A1 | 9/2018 | Lloyd et al. |
| 2018/0297114 | A1 | 10/2018 | Preston et al. |
| 2018/0341248 | A1 | 11/2018 | Mehr et al. |
| 2018/0358271 | A1 | 12/2018 | David |
| 2018/0376067 | A1 | 12/2018 | Martineau |
| 2019/0001657 | A1 | 1/2019 | Matusik et al. |
| 2019/0004079 | A1 | 1/2019 | Blom et al. |
| 2019/0094842 | A1 | 3/2019 | Lee et al. |
| 2019/0094843 | A1 | 3/2019 | Lee et al. |
| 2019/0099954 | A1 | 4/2019 | Vilajosana et al. |
| 2019/0105801 | A1 | 4/2019 | Martinez et al. |
| 2019/0118300 | A1 | 4/2019 | Penny et al. |
| 2019/0227525 | A1 | 7/2019 | Mehr et al. |
| 2019/0295906 | A1 | 9/2019 | Clark et al. |
| 2020/0096970 | A1 | 3/2020 | Mehr et al. |
| 2020/0111689 | A1 | 4/2020 | Banna et al. |
| 2020/0247063 | A1 | 8/2020 | Pinskiy et al. |
| 2021/0089003 | A1 | 3/2021 | Guerrier et al. |

(56) References Cited

U.S. PATENT DOCUMENTS

| | | |
|---|---|---|
| 2021/0191363 A1 | 6/2021 | Mehr et al. |
| 2021/0397938 A1 | 12/2021 | Tora et al. |
| 2023/0182235 A1 | 6/2023 | Penny et al. |

FOREIGN PATENT DOCUMENTS

| | | |
|---|---|---|
| CN | 101943896 A | 1/2011 |
| CN | 101943896 B | 2/2012 |
| CN | 102754035 | 10/2012 |
| CN | 103338880 A | 10/2013 |
| CN | 104254768 A | 12/2014 |
| CN | 104254769 A | 12/2014 |
| CN | 104890238 A | 9/2015 |
| CN | 105291428 A | 2/2016 |
| CN | 105452895 A | 3/2016 |
| CN | 105555509 A | 5/2016 |
| CN | 106802626 A | 6/2017 |
| CN | 107180451 A | 9/2017 |
| CN | 107263858 A | 10/2017 |
| CN | 107498874 | 12/2017 |
| CN | 108778687 | 11/2018 |
| CN | 108883575 | 11/2018 |
| CN | 109203479 | 1/2019 |
| CN | 109989585 A | 7/2019 |
| EP | 1437882 A1 | 7/2004 |
| EP | 2585248 B1 | 10/2017 |
| EP | 3459715 | 3/2019 |
| FR | 3046370 A1 | 7/2017 |
| GB | 1573135 | 8/1980 |
| JP | H05345359 A | 12/1993 |
| JP | 2001321356 | 11/2001 |
| JP | 2005345359 A | 12/2005 |
| JP | 2016004073 A | 1/2016 |
| JP | 2016533925 A | 11/2016 |
| JP | 2017113979 A | 6/2017 |
| JP | 2017144534 A | 8/2017 |
| JP | 2017217911 A | 12/2017 |
| JP | 2018008403 A | 1/2018 |
| JP | 2018024242 A | 2/2018 |
| JP | 2019155606 A | 9/2019 |
| JP | 2019177494 A | 10/2019 |
| JP | 2019206094 A | 12/2019 |
| JP | 2019217729 A | 12/2019 |
| JP | 2020001302 A | 1/2020 |
| JP | 2020052168 A | 4/2020 |
| JP | 2020069662 A | 5/2020 |
| JP | 2020082549 A | 6/2020 |
| JP | 2020086784 A | 6/2020 |
| JP | 2020104524 A | 7/2020 |
| JP | 2020132937 A | 8/2020 |
| JP | 6749582 B2 | 9/2020 |
| JP | 2020138394 A | 9/2020 |
| JP | 2020527475 A | 9/2020 |
| JP | 2020530528 A | 10/2020 |
| JP | 2020533481 A | 11/2020 |
| JP | 6950034 B2 | 10/2021 |
| KR | 2004-0038876 | 5/2004 |
| KR | 2017-0010140 | 1/2017 |
| TW | 201610629 A | 3/2016 |
| WO | 0117671 A1 | 3/2001 |
| WO | 2015020939 A1 | 2/2015 |
| WO | 2016040453 | 3/2016 |
| WO | 2018031594 A1 | 2/2018 |
| WO | 2018127827 A1 | 7/2018 |
| WO | 2019125970 A1 | 6/2019 |
| WO | 2019195095 A1 | 10/2019 |
| WO | 2020095453 A1 | 5/2020 |

OTHER PUBLICATIONS

Flynn J.M., et al., "Hybrid Additive and Subtractive Machine Tools-research and Industrial Developments," International Journal of Machine Tools and Manufacture, 2016, vol. 101, pp. 79-101.

Adams D.W., et al., "Implicit Slicing Method for Additive Manufacturing Processes," In the Proceedings of the Solid Freeform Fabrication Symposium, Austin TX, Aug. 7-9, 2017, pp. 844-857.
Albus J.S., "A New Approach To Manipulator Control: The Cerebellar Model Articulation Controller (CMAC)1," Journal of Dynamic Systems, Measurement, and Control, Sep. 1975, pp. 220-227.
American Society for Quality: "What is Statistical Process Control?," 2021, 07 Pages, [Retrieved on Jul. 23, 2019], Retrieved from URL: https://asq.org/quality-resources/statistical-process-control.
Aminzadeh M., "A Machine Vision System for In-Situ Quality Inspection in Metal Powder-Bed Additive Manufacturing," Dec. 2016, pp. 1-285.
An J., etaL, "Variational Autoencoder Based Anomaly Detection Using Reconstruction Probability," Special Lecture on IE 2.1,Dec. 27, 2015, pp. 1-18.
Ang K.H., et al., "PID Control System Analysis, Design, and Technology," IEEE Transactions on Control Systems Technology, Jul. 2005, vol. 13, No. 4, pp. 559-576, 20 Pages.
Bishop., "Pattern Recognition and Machine Learning," Springer, 2006, 758 pages.
Brackett D., et al., "Topology Optimization for Additive Manufacturing," In the Proceedings of the Solid Freeform Fabrication Symposium, Austin, TX, US, Aug. 8-10, 2011, pp. 348-362.
Caron M., et al., "Deep Clustering For Unsupervised Learning of Visual Features," CoRR, arXiv: abs/1807.05520, 2018, pp. 1-18.
Cheng J., et al., "Long Short-Term Memory-Networks for Machine Reading," arXiv: 1601.06733v7, 2016, pp. 1-11.
Cho K., et al., "Learning Phrase Representation Using RNN Encoder-Decoder for Statistical Machine Translation," arXiv preprint arXiv: 1406.1078v3, Jun. 3, 2014, pp. 1-15.
Dean J., et al., "Large Scale Distributed Deep Network," NIPS, 2012, pp. 1-11.
Dong C., et al., "Accelerating the Super-Resolution Convolutional Neural Network," In European Conference on Computer Vision, Springer, 2016, pp. 391-407.
Extended European Search Report for European Application No. 19781688.7, mailed Nov. 17, 2021, 12 Pages.
Extended European Search Report for European Application No. 20790652.0, mailed Oct. 6, 2022, 10 Pages.
Extended European Search Report for European Application No. 23177462.1, mailed Jul. 21, 2023, 9 Pages.
Farzadi A., et al., "Effect of Layer Thickness and Printing Orientation on Mechanical Properties and Dimensional Accuracy of 3D Printed Porous Samples for Bone Tissue Engineering," PLOS One, Sep. 18, 2014, vol. 9, No. 9, Article e108252, pp. 1-14.
Final Office Action for U.S. Appl. No. 15/943,442, mailed Jan. 25, 2019, pp. 1-19.
Garanger K., et al., "Foundations of Intelligent Additive Manufacturing," Cornell University, Apr. 18, 2017, pp. 1-9.
Glorot X., et al., "Understanding the Difficulty of Training Deep Feedforward Neural Networks," In Proceedings of the thirteenth international conference on artificial intelligence and statistics, 2010, vol. 9, pp. 249-256.
Guo Y., et al., "Additive Manufacturing Systems," In Intelligent Systems Automation and Control, Dec. 12, 2018, pp. 1-6, Retrieved From URL: http://isaaclabrpi.com/project/additive-manufacturing-systems/.
Hinton G.E., et al., "Reducing the Dimensionality of Data With Neural Networks," Science, Jul. 28, 2006, vol. 313, No. 5786, pp. 504-507, 05 Pages.
Hodgson G., et al., "Slic3r Manual Print Setting," Technical Paper, Mar. 17, 2018, pp. 1-21.
Hou Y., et al., "A Novel DDPG Method with Prioritized Experience Replay," IEEE International Conference on Systems, Man, and Cybernetics (SMC), Oct. 5-8, 2017, pp. 316-321.
International Preliminary Report on Patentability for International Application No. PCT/US2019/024795, mailed Oct. 15, 2020, 8 Pages.
International Preliminary Report on Patentability for International Application No. PCT/US2020/049886, mailed Mar. 24, 2022, 07 Pages.

(56) References Cited

OTHER PUBLICATIONS

International Search Report and Written Opinion for International Application No. PCT/US2019/024795, mailed Jun. 28, 2019, 13 Pages.

International Search Report and Written Opinion for International Application No. PCT/US2020/029020, mailed Aug. 3, 2020, 7 Pages.

International Search Report and Written Opinion for International Application No. PCT/US2020/049886, mailed Dec. 8, 2020, 08 Pages.

Jin X., et al., "K-Means Clustering," Boston, MA: Springer US, 2010, pp. 563-564, 10 Pages.

Kalchbrenner N., et al., "A Convolutional Neural Network for Modelling Sentences," arXiv preprint arXiv: 1404.2188v1, Apr. 8, 2014, 11 pages.

Karnouskos S., "Stuxnet Worm Impact On Industrial Cyber-Physical System Security," IECON, 37th Annual Conference of the IEEE Industrial Electronics Society, IEEE, 2011, 5 Pages.

Kazemian A., et al., "Computer Vision for Real-time Extrusion Quality Monitoring and Control in Robotic Construction," Automation in Construction, Jan. 31, 2019, vol. 101, pp. 92-98, 08 Pages, DOI: 10.1016/J.AUTCON.2019.01.022, ISSN: 0926-5805, XP085607490.

Kim B., et al., "Depth and Shape From Shading Using the Photometric Stereo Method," CVGIP: Image Understanding, Nov. 1991, vol. 54, No. 3, pp. 416-427.

Koch W., et al., "Reinforcement Learning for UAV Attitude Control," ACM Transactions on Cyber-Physical Systems, Feb. 2019, vol. 3, No. 2, Article 22, 21 Pages.

Krizhevsky A., et al., "ImageNet Classification With Deep Convolutional Neural Networks," Advances in Neural Information Processing Systems, 2012, pp. 1097-1105, 9 Pages.

Lardinois F., "Nvidia's Researchers Teach a Robot to Perform Simple Tasks by Observing a Human," 6 Pages, [Retrieved on Mar. 11, 2019], Retrieved from URL: https://techcrunch.com/2018/05/20/nvidias-researchers-teach-a-robot-to-learn-simple-tasks-by-observing-a-human/?utm_source=tcfbpageutm_medium=feedutm_campaign=Feed%3A+Techcrunch+%28TechCrunch%29sr_share=facebook.

Lawrence S., et al., "Face Recognition: A Convolutional Neural-Network Approach," IEEE Transactions on Neural Networks, Jan. 1997, vol. 8, No. 1, pp. 98-113.

Lillicrap T.P., et al., Continuous Control With Deep Reinforcement Learning, Published as a Conference Paper at ICLR 2016, arXiv: 1509.02971v6 [cs.LG], Last Revised on Jul. 5, 2019, 14 Pages.

Limoge D.W., et al., "An Adaptive Observer Design for Real-Time Parameter Estimation in Lithium-Ion Batteries," IEEE Transactions on Control Systems Technology, Mar. 2020, vol. 28, No. 2, pp. 505-520.

Limoge D.W., etaL, "Inferential Methods for Additive Manufacturing Feedback," American Control Conference (ACC), IEEE, 2020, 08 pages.

Limoge D.W., etaL, "Inferential Methods for Additive Manufacturing Feedback," Printed on Sep. 9, 2020, 7 Pages.

Lin L-J., "Self-Improving Reactive Agents Based on Reinforcement Learning, Planning and Teaching," Machine Learning, 1992, vol. 8, No. 3-4, pp. 293-321, pp. 69-97.

Liu H., et aL, "Intelligent Tuning Method of Pid Parameters Based on Iterative Learning Control for Atomic Force Microscopy," Science Direct Micron, 2018, vol. 104, pp. 26-36.

Lu L., et al., "A Layer-To-Layer Model and Feedback Control of Ink-Jet 3-D Printing," In IEEE Transactions on Mechatronics, Jun. 2015, vol. 20, No. 3, pp. 1056-1068.

Malhotra P., et al., "LSTM-Based Encoder-Decoder for Multi-Sensor Anomaly Detection," arXiv preprint arXiv: 1607.00148, Last Revised on Jul. 11, 2016, 5 pages.

McFarlane R., "A Survey of Exploration Strategies in Reinforcement Learning," 2003, pp. 1-10.

Milletari F., et al., "V-Net: Fully Convolutional Neural Networks for Volumetric Medical Image Segmentation," In 2016 Fourth International Conference on 3D Vision (3DV), IEEE, 2016, pp. 1-11.

Mnih V., et al., "Asynchronous Methods for Deep Reinforcement Learning," Proceedings of the 33rd International Conference on Machine Learning, arXiv:1602.01783v2, Jun. 16, 2016, 19 Pages.

Mnih V., et al., "Asynchronous Methods for Deep Reinforcement Learning," Proceedings of the 33rd International Conference on Machine Learning, Jun. 2016, pp. 1-10.

Office Action for Korean Patent Application No. 10-2022-7011079, mailed Apr. 29, 2024, 12 pages.

Mnih V., etaL, "Playing Atari With Deep Reinforcement Learning," arXiv preprint arXiv: 1312.5602v1, Dec. 19, 2013, 9 pages.

Nair A., et al., "Massively Parallel Methods for Deep Reinforcement Learning," CoRR, 2018, pp. 1-14, Jul. 16, 2015.

Ng A., "Sparse Autoencoder," CS294A Lecture Notes 72.2011, 2011, pp. 1-19.

Ngo T.D., et al., "Additive Manufacturing (3D Printing): A Review of Material, Methods, Application and Challenges," Composites Part B: Engineering, IEEE, 2017, vol. 143, pp. 172-196.

No Author, "Adaptive Methods and Real-Time Decision Making for Planning and Control of Manufacturing Processes," Printed on Sep. 9, 2020, 8 pages.

Non-Final Office Action for U.S. Appl. No. 15/943,442, mailed Jun. 29, 2018, pp. 1-17.

Notice of Allowance for U.S. Appl. No. 15/943,442, mailed Jul. 12, 2019, pp. 1-19.

Notice of Allowance for U.S. Appl. No. 15/943,442, mailed Oct. 31, 2019, pp. 1-26.

Oakland J.S., "Statistical Process Control," Butterworth-Heinemann, 1986, 461 pages.

Office Action for Japanese Patent Application No. 2022050282, mailed Apr. 21, 2023, 4 pages.

Office Action for Japanese Patent Application No. 2022515770, mailed Jun. 16, 2023, 4 Pages.

Office Action for Korean Patent Application No. 10-2021-7037371, mailed Jun. 26, 2023, 8 pages.

Office Action for Taiwan Patent Application No. 108110747, dated Jan. 13, 2020, pp. 1-14, 26 Pages.

Ogawa M., et al., "Practice and Challenges in Chemical Process Control Applications in Japan," Proceedings of the 17th World Congress the International Federation of Automatic Control, Seoul, Korea, Jul. 6-11, 2008, pp. 10608-10613.

Oh K-S., et al., "GPU Implementation of Neural Networks," Pattern Recognition, 2004, vol. 37, No. 6, pp. 1311-1314, 05 Pages.

OpenAI: "OpenAI Five," Jun. 25, 2018, 17 Pages, [Retrieved on Sep. 9, 2020], Retrieved From URL: https://openai.com/blog/openai-five/.

Otterness N., et al., "An Evaluation of the Nvidia TX1 for Supporting Real-time Computer-Vision Workloads," In 2017 IEEE Real-Time and Embedded Technology and Applications Symposium (RTAS), IEEE, 2017, pp. 1-11.

Peng J., et al., "Incremental Multi-Step Q-Learning," Machine Learning, 1996, vol. 22, No. 1-3, pp. 283-290.

Pertuz S., et al., "Analysis of Focus Measure Operators for Shape-From-Focus," In Intelligent Robotics and Computer Vision Group, Universitat Rovira I Virgili, 2013, pp. 1415-1432, 19 Pages.

Purdue University: "Intrusion Alert: System Uses Machine Learning, Curiosity-Driven 'Honeypots' To Stop Cyber Attackers," Research Foundation News, Feb. 6, 2020, 06 Pages, Retrieved From URL: https:// engineering.purdue.edu/ECE/News/2020/intrusion-alert-system-uses-machine-learning-curiosity-driven-honeypots-to- stop-cyber-attackers.

Putman., et al., "Predictive Process Control for a Manufacturing Process," Application as filed, U.S. Appl. No. 16/519,102, filed Jul. 23, 2019, 54 pages.

Rankouhi B., et al., "Failure Analysis and Mechanical Characterization of 3D Printed ABS With Respect to Layer Thickness and Orientation," Journal of Failure Analysis and Prevention, 2016, vol. 16, No. 3, pp. 467-481.

(56) References Cited

OTHER PUBLICATIONS

Re:3D INC.,: "Getting a Good Print," Last Updated on Apr. 17, 2015, pp. 1-5, [Retrieved on Jul. 9, 2020], Retrieved from URL: http://wiki.re3d.org/index.php?title=Getting_a_good_print&oldid=6555.
Roschli A., et al., "ORNL Slicer 2: A Novel Approach for Additive Manufacturing Tool Path Planning," In the Proceedings of the Solid Freeform Fabrication Symposium, Austin, TX, Aug. 7-9, 2017, pp. 896-902.
Sakurada M., et al., "Anomaly Detection Using Autoencoders With Nonlinear Dimensionality Reduction," Proceedings of the Machine Learning for Sensory Data Analysis (MLSDA) 2nd Workshop on Machine Learning for Sensory Data Analysis, 2014, 8 Pages.
Salakhutdinov R., et al., "Semantic Hashing," International Journal of Approximate Reasoning, 2009, vol. 50, No. 7, pp. 969-978.
Saunders J.A., et al., "Visual Feedback Control of Hand Movements," The Journal of Neuroscience, Mar. 31, 2004, vol. 24, No. 13, pp. 3223-3234.
Schaul T., etaL, "Prioritized Experience Replay," arXiv preprint arXiv: 1511.05952v4, ICLR2016, Feb. 25, 2016, 21 pages.
Shewalkar A., et al., "Performance Evaluation of Deep Neural Networks Applied to Speech Recognition: RNN, LSTM and GRU," Journal of Artificial Intelligence and Soft Computing Research, 2019, vol. 9, No. 4, pp. 235-245.
Shi B., et al., "Self-Calibrating Photometric Stereo," In Key Lab of Machine Perception, Peking University, Jun. 2010, pp. 1-8.
Silver D., et al., "Mastering The Game of Go With Deep Neural Networks and Tree Search," Nature, Jan. 28, 2016, vol. 529, (7587), pp. 484-489, 20 Pages.
Slotin J-J.E., et al., "Applied Nonlinear Control," Prentice Hall Englewood Cliffs, NJ, 1991, pp. 1-259.
Sotiris B., et al., "Multivariate Statistical Process Control Charts: An Overview," Quality and Reliability Engineering International, 2007, vol. 23, No. 5, pp. 517-543, 28 Pages.
SPC for Excel: "Control Chart Rules and Interpretation," BPI Consulting, LLC, Mar. 2016, 20 Pages, [Retrieved on Jul. 23, 2019], Retrieved From URL: https://www.spcforexcel.com/knowledge/control-chart-basics/control-chart-rules-interpretation.
SPC for Excel: "Interpreting Control Charts," BPI Consulting, LLC, Apr. 2004, 9 Pages, [Retrieved on Jul. 23, 2019], Retrieved From URL: https://www.spcforexcel.com/knowledge/control-charts-basics/interpreting-control-charts.
Sutton, et al., "Reinforcement Learning: An Introduction," MIT Press, 2018, 352 pages.
Sutton R.S., et al., "Dyna-Style Planning With Linear Function Approximation and Prioritized Sweeping," Proceedings of the Twenty-Fourth Conference on Uncertainty in Artificial Intelligence, 2008, pp. 1-9.
Szkilnyk G., "Vision Based Fault Detection in Assembly Automation," Queen's University, Jun. 2012, 219 Pages.
Tavakoli A., et al., "Action Branching Architectures for Deep Reinforcement Learning," arXiv preprint arXiv: 1711.08946v2, Jan. 25, 2019, 9 Pages.
Tjahjono B., et al., "Six Sigma: a Literature Review," International Journal of Lean Six Sigma, Aug. 6, 2010, 31 Pages.
Torrado A.R., et al., "Failure Analysis and Anisotropy Evaluation of 3D-Printed Tensile Test Specimens of Different Geometries and Print Raster Patterns," Journal of Failure Analysis and Prevention, 2016, vol. 16, No. 1, pp. 154-164.
Torreao J R.A., "Estimating 3-D Shape from the Optical Flow of Photometric Stereo Images," Proceedings of the 6th Ibero-American Conference on AI: Progress in Artificial Intelligence, Springer-Verlag, Oct. 5, 1998, pp. 253-261.
Turner B.N., et al., "A Review of Melt Extrusion Additive Manufacturing Processes: I. Process Design and Modeling," Rapid Prototyping Journal, 2014, vol. 20, No. 3, pp. 192-204.
Turner B.N., et al., "A Review of Melt Extrusion Additive Manufacturing Processes: II. Materials, Dimensional Accuracy, and Surface Roughness," Rapid Prototyping Journal, 2015, vol. 21, No. 3, pp. 250-261.
Vecerik M., et aL, "Leveraging Demonstrations for Deep Reinforcement Learning on Robotics Problems with Sparse Rewards," arXiv preprint, arXiv: 1707.08817, Submitted on Jul. 27, 2017, 10 Pages, Last revised on Oct. 8, 2018.
Watkins C.J.C.H., "Learning From Delayed Rewards," PhD Thesis, University of Cambridge England, May 1989, pp. 1-241.
Whitney W.F., et aL, "Dynamics-Aware Embeddings," arXiv preprint arXiv: 1908.09357v3, ICLR 2020, Jan. 14, 2020, 17 pages.
Woodall W.H., "Controversies And Contradictions In Statistical Process Control," Journal of Quality Technology, Oct. 12-13, 2000, vol. 32, No. 4, pp. 341-350.
Woodall W.H., et al., "Research Issues and Ideas in Statistical Process Control," Journal of Quality Technology, 1999, vol. 31, No. 4, pp. 376-386, 12 Pages.
Yin W., et al., "Comparative Study of CNN and RNN for Natural Language Processing," arXiv preprint arXiv: 1702.01923v1, 2017, pp. 1-7.
Office Action for Chinese Patent Application No. 202210941812.0, mailed Mar. 21, 2025, 6 pages.
Office Action for Korean Patent Application No. 10-2023-7033202, mailed Oct. 28, 2024, 8 pages.
Kruth, et al., "Feedback control of selective laser melting," Virtual and Rapid Manufacturing, CRC Press, 2007, pp. 521-528.
Cheng, et al., "Vision-based online process control in manufacturing applications," IEEE Transactions on Automation ,Science and Engineering 5.1, 2008, pp. 140-153.
Song, et al., "Feedback control of melt pool temperature during laser cladding process," IEEE Transactions on control systems technology 19.6, 2010, pp. 1349-1356.
Office Action for TW Patent Application No. 112138756, mailed Jun. 18, 2024, 14 pages.
Zheng G., et al., "Wide-Field, High-Resolution Fourier Ptychographic Microscopy," HHS Public Access, Nature Photonics, Available in PMC Sep. 19, 2014, pp. 1-16. Published in Final Edited Form as: Nature Photonics, Sep. 1, 2013, vol. 7, No. 9, pp. 739-745. DOI: 10.1038/nphoton.2013.187.
Zhong R.Y., et aL, "Intelligent Manufacturing in the Context of Industry 4.0: A Review," Engineering, Mar. 31, 2017, vol. 3, No. 5, pp. 616-630.
Zhou C., et al., "Anomaly Detection with Robust Deep Autoencoders," Proceedings of the 23rd ACM SIGKDD International Conference on Knowledge Discovery and Data Mining, Aug. 13-17, 2017, pp. 665-674.
Notice of Allowance for CN Patent Application No. 202080029953.4, mailed Sep. 19, 2023, 5 pages.
Noice of Allowance of Japanese Patent Application No. 2023-046860, mailed Aug. 2, 2024, 4 pages.
Extended European Search Report for Application No. 20864085.4, dated Aug. 29, 2023, 10 pages.
Extended European Search Report for European Patent Application No. 20864085.4, mailed Aug. 29, 2023, 10 Pages.
Office Action and Search Report from Taiwan Patent Application No. 112133393, dated Feb. 16, 2024, 6 pages.
Office Action for Japanese Patent Application No. 2023116959, mailed Feb. 2, 2024, 5 pages.
Office Action Chinese Application No. 202080064310.3, mailed Mar. 22, 2024, 9 Pages.
Office Action Japanese Application No. 2023-046860, mailed Mar. 22, 2024, 7 Pages.
Intention to Grant Notification from EP Application No. 20864085.4, dated Jul. 23, 2025, 8 pages.

Print Quality

Layer Height

Shell Thickness

Retraction

Infill

Infill Density

Infill Pattern

Object Placement and Orientation

Location of the Object on the Build Plate

Orientation of the object on the build plate

Support

Support Type

Platform Adhesion Type

Speed and Temperature Settings

Print Head Speed

Build Plate Speed

Print Head Temperature

Build Plate Temperature

SYSTEMS, METHODS, AND MEDIA FOR ARTIFICIAL INTELLIGENCE PROCESS CONTROL IN ADDITIVE MANUFACTURING

CROSS REFERENCE TO RELATED APPLICATION

This application is a continuation of U.S. patent application Ser. No. 17/444,619, filed Aug. 6, 2021, which is a continuation of U.S. patent application Ser. No. 16/853,640, filed Apr. 20, 2020, now U.S. Pat. No. 11,084,225, issued Aug. 10, 2021, which is a continuation-in-part of U.S. patent application Ser. No. 16/723,212, filed Dec. 20, 2019, now U.S. Pat. No. 11,097,490, issued Aug. 24, 2021, which is a continuation of U.S. patent application Ser. No. 15/943,442, filed Apr. 2, 2018, now U.S. Pat. No. 10,518,480, issued Dec. 31, 2019, and is a continuation of International Application No. PCT/US2019/024795, filed Mar. 29, 2019. U.S. patent application Ser. No. 16/853,640 also claims the benefit of U.S. Provisional Application No. 62/836,199, filed Apr. 19, 2019, U.S. Provisional Application No. 62/836,202, filed Apr. 19, 2019, U.S. Provisional Application No. 62/836,213, filed Apr. 19, 2019, and U.S. Provisional Application No. 62/898,535, filed Sep. 10, 2019. All of the foregoing are incorporated by reference in their entireties.

TECHNICAL FIELD

The present disclosure relates to mechanisms for providing artificial intelligence process control in additive manufacturing.

BACKGROUND

Additive manufacturing systems, such as 3D printers and cell printers, are widely used to deposit multiple layers of natural, synthetic, or biological materials to manufacture objects through processes of extrusion, sintering, light polymerization, mechanosynthesis or electrohydrodynamic forces. The process of additive manufacturing fabricates an object through a layer deposition process, where the additive manufacturing printer keeps adding successive layers until the printed object is complete.

Generally, an object printed by an additive manufacturing printer is based on a production design. Three-dimensional modeling software (e.g., a CAD program) can be used to create a production design for an object to desired specifications. A slicing program can then translate the production design into numerical control code (e.g., G-code), which divides the design into a number of layers and which can then be used to instruct an additive manufacturing printer to print a physical representation of each individual layer of the production design. The goal of additive manufacturing is to print an object that adheres closely to the specifications of the production design.

A printed object can take anywhere from several hours to several days to complete, depending on the size and complexity of the production design. Current additive manufacturing systems are limited in the type of feedback they can provide and the corrective action that they can take after each layer of an object is printed. Often feedback is not provided until the entire object has printed. When feedback is provided during the printing process for an object, it is usually for the purpose of determining whether to stop or to continue printing the object.

In some additive manufacturing systems, feedback is provided by shadows created by the printed object when light is shined on the object. This method is limited, because the shadows obstruct areas of the printed object and prevent precise feedback. Precise feedback in additive manufacturing is useful to maintain quality and reproducible printed objects.

Accordingly, it is desirable to provide artificial intelligence process control (AIPC) for each printed layer of an object so that timely corrective action can be taken during the printing process for the object. It is also desirable to provide AIPC to achieve the desired mechanical, optical and/or electrical properties of a printed object, as well as to achieve a printed object that closely resembles its production design, or improves upon the production design.

SUMMARY

In accordance with some embodiments, systems, methods, and media for artificial intelligence process control in additive manufacturing are provided. In some embodiments, the systems comprise: a print head that is configured to print an object in a layer by layer manner; an image sensor configured to capture an image of a printed layer of the object; and a hardware processor that is configured to: receive the captured image; sample the captured image to generate a low-resolution version of the captured image; apply a trained failure classifier to the low-resolution version of the captured image; determine, based on a classification obtained from the failure classifier, that a non-recoverable failure is not present in the printed layer of the object; in response to determining that a non-recoverable failure is not present in the printed layer, generate a cropped version of the low-resolution version of the captured image; apply a trained binary error classifier to the cropped version of the low-resolution version of the captured image; determine, based on a classification obtained from the binary error classifier, that an error is present in the printed layer of the object; in response to determining that the error is present in the printed layer of the object, apply a trained extrusion classifier to the captured image, wherein the trained extrusion classifier generates an extrusion quality score indicating a quality of extrusion of material in the printed layer of the object; and adjust a value of a parameter of the print head based on the extrusion quality score to print a subsequent layer of the printed object.

In some embodiments, methods for additive manufacturing are provided, the methods comprising: receiving the captured image; sampling the captured image to generate a low-resolution version of the captured image; applying a trained failure classifier to the low-resolution version of the captured image; determining, based on a classification obtained from the failure classifier, that a non-recoverable failure is not present in the printed layer of the object; in response to determining that a non-recoverable failure is not present in the printed layer, generating a cropped version of the low-resolution version of the captured image; applying a trained binary error classifier to the cropped version of the low-resolution version of the captured image; determining, based on a classification obtained from the binary error classifier, that an error is present in the printed layer of the object; in response to determining that the error is present in the printed layer of the object, applying a trained extrusion classifier to the captured image, wherein the trained extrusion classifier generates an extrusion quality score indicating a quality of extrusion of material in the printed layer of the object; and adjusting a value of a parameter of the print head based on the extrusion quality score to print a subsequent layer of the printed object.

In some embodiments, non-transitory computer-readable media containing computer-executable instructions that, when executed by a processor, cause the processor to perform a method for additive manufacturing are provided, the method comprising: sampling the captured image to generate a low-resolution version of the captured image; applying a trained failure classifier to the low-resolution version of the captured image; determining, based on a classification obtained from the failure classifier, that a non-recoverable failure is not present in the printed layer of the object; in response to determining that a non-recoverable failure is not present in the printed layer, generating a cropped version of the low-resolution version of the captured image; applying a trained binary error classifier to the cropped version of the low-resolution version of the captured image; determining, based on a classification obtained from the binary error classifier, that an error is present in the printed layer of the object; in response to determining that the error is present in the printed layer of the object, applying a trained extrusion classifier to the captured image, wherein the trained extrusion classifier generates an extrusion quality score indicating a quality of extrusion of material in the printed layer of the object; and adjusting a value of a parameter of the print head based on the extrusion quality score to print a subsequent layer of the printed object.

BRIEF DESCRIPTION OF THE DRAWINGS

FIG. 3 is an example of an interface for an operator to input print parameters into a numerical control code generator in accordance with some embodiments.

DETAILED DESCRIPTION

In accordance with some embodiments of the disclosed subject matter, mechanisms (which can include systems, methods, devices, apparatuses, etc.) for additive manufacturing artificial intelligence process control (AIPC) are provided. AIPC can be useful, for example, to optimize the printing parameters of an additive manufacturing system to achieve desired mechanical, optical and/or electrical properties and/or desired accuracy of a printed object compared to a production design. AIPC can also be useful to identify anomalies in a printed layer and to take corrective action during a printing process.

As disclosed herein, in some embodiments, artificial intelligence can be used to learn from and improve upon additive manufacturing as described herein and to output feedback, information, data, and/or instruction (this process of learning, improving and outputting such information, data and/or instruction is referred to herein as "AIPC"). The artificial intelligence algorithms/machine learning models can include one or more of the following, alone or in combination: reinforcement learning; hidden Markov models; recurrent neural networks; convolutional neural networks; Bayesian symbolic methods; generative adversarial networks; support vector machines; and/or any other suitable artificial intelligence algorithm. While AIPC is based on AI algorithms, AIPC can also use data collected during additive manufacturing that is not based on artificial intelligence algorithms.

Figure 1:
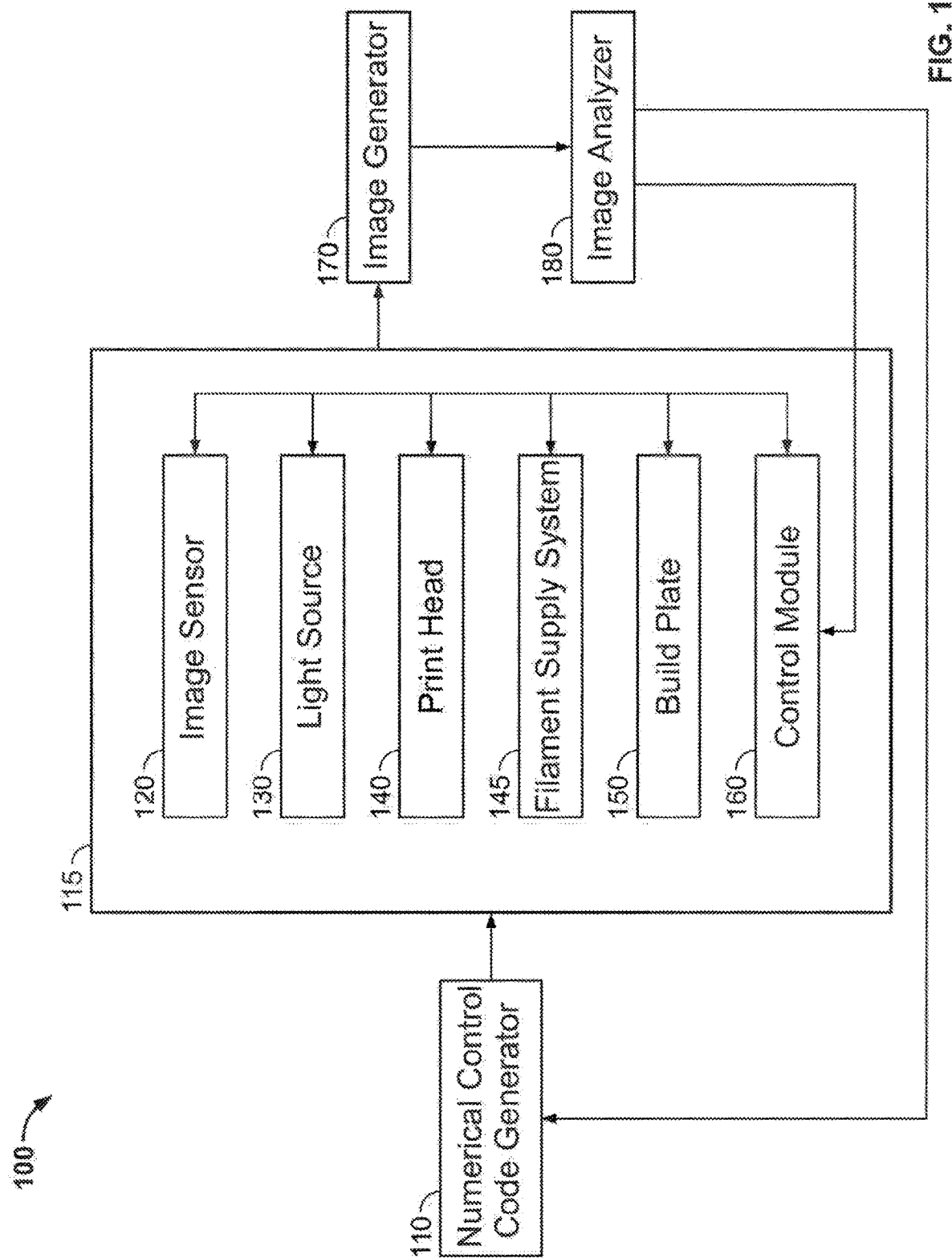
FIG. 1 is an example of an additive manufacturing system in accordance with some embodiments.

FIG. 1 illustrates an example additive manufacturing system 100 that can implement AIPC according to some embodiments of the disclosed subject matter. At a high level, the basic components of additive manufacture system 100, according to some embodiments, include numerical control code generator 110, additive manufacturing printer 115, image generator 170, and image analyzer 180. Additive manufacturing printer 115 can include image sensor 120, light source 130, print head 140, filament supply system 145, build plate 150 and control module 160. The functionality of the components for additive manufacturing system 100 can be combined into a single component or spread across several components. In some embodiments, the functionality of some of the components (e.g., numerical control code generator 110, image generator 170, and/or image analyzer 180) can be performed remotely from the additive manufacturing printer 115.

Note that additive manufacturing system 100 can include other suitable components not shown. Additionally or alternatively, some of the components included in additive manufacturing system 100 can be omitted.

Although the following description refers to using AIPC with a fused deposition modeling additive manufacturing printer, in some embodiments, the AIPC described herein can be used with any suitable 3-D printing technology, including stereolithography (SLA), electron beam melting, direct metal deposition (electrohydrodynamic printing) and selective laser sintering.

In some embodiments, additive manufacturing printer 115 can include one or more image sensors 120 for capturing images and/or video during the printing process. The image sensor(s) 120 can be configured to capture images (or video) of an object while and/or after each layer of the object is printed. Image sensor 120 can be, for example, a charge coupled device (CCD) or a complementary metal oxide semiconductor (CMOS) sensor like what might be used in a digital still and/or video camera. Image sensor 120 can also include an infrared (IR) camera for capturing thermal images and/or video of an object and performing temperature calculations. Image sensors 120 can be located at different positions and angles relative to build plate 150 and/or print head 140.

In some embodiments, additive manufacturing printer 115 can include a single light source 130 or multiple light sources (e.g., a multi-light vector), located at different positions and angles relative to build plate 150 and/or relative to image sensor 120 (e.g., the light source can be located circumferentially around image sensor 120). The illumination can vary by size, number of light sources used, and/or the position and angle of illumination. The illumination can be used to illuminate a printed layer of an object so that image sensor 120 can capture images and/or video of the object.

The captured images and/or video can be stored in memory and can be used to create three-dimensional topography images, and/or other suitable images, of the printed layer, as discussed herein in connection with image generator 170.

Figure 2:
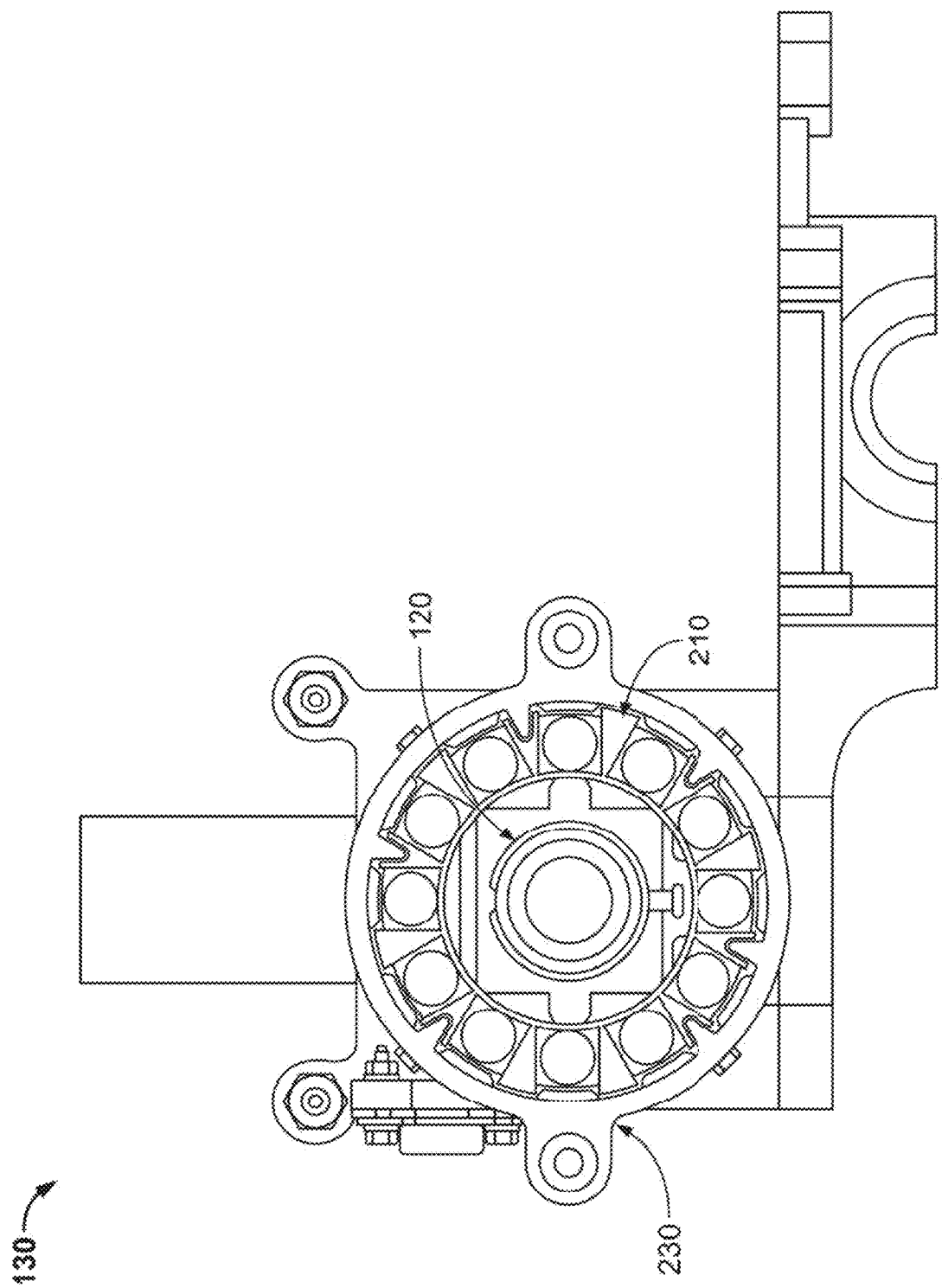
FIG. 2 is an example of a camera and a light source that can be used with an additive manufacturing printer in accordance with some embodiments.

FIG. 2 shows an example of camera 120 and light source 130 that can be used with additive manufacturing printer 115. FIG. 2 includes a camera 120 surrounded by a light-emitting diode (LED) ring 210 resting in LED holder 230. In some embodiments, control module 160 controls the individual LEDs within LED ring 210, determining which LEDs should be illuminated. The control of the individual LEDs within LED ring 210 can be determined by the requirements of the topographical imaging technique used to generate images of the printed layer.

As described above, additive manufacturing printer 115 can also include one or more print heads 140 and one or more build plates 150. Print head(s) 140 and/or build plate(s) 150 can move with respect to the other in X (width), Y (length) and Z (height) dimensions. Print head(s) 140 can hold filament, supplied by filament supply system 145, that is extruded in a layer by layer manner through one or more nozzles of print head(s) 140. In some embodiments, the temperature of the print head nozzle(s) can be controlled to heat up the filament stored in print head(s) 140 to keep the filament in a flowable form that can be deposited (e.g., when print head(s) 140 and/or build plate(s) 150 move with respect to the other, and/or when print head(s) 140 and/or build plate(s) 150 are static). The extruded material can fuse to build plate(s) 150 (as is the case for the first extruded layer) or to a previously deposited extruded layer. Other aspects of print head(s) 140 and/or build plate(s) 150 that can be controlled include, for example, paths that print head(s) 140 and/or build plate(s) 150 follow during movement, amount(s) that the print head(s) and/or build plate(s) 150 move with respect to the other along the Z-axis dimension when transitioning between layers of a production design, orientation(s) of print head(s) 140 and/or build plate(s) 150 with respect to the other, speed(s) of movement of print head(s) 140 and/or build plate(s) 150, and amount(s) and rate(s) of filament that print head(s) 140 deposit. In some embodiments, the print path can be defined by at least two sets of X-Y-Z coordinates. During operation, the print head(s) and/or build plate(s) can be controlled to move with respect to the other and the print head(s) can release filament in a desired infill pattern. In some embodiments, print head(s) 140 and/or build plate(s) 150 can be controlled by code from numerical control code generator 110 and/or control module 160.

In some embodiments, build plate 150 can be heated to a predetermined temperature and can be oriented in different directions.

In some embodiments, control module 160, which, in some embodiments, can include a controller and controller interface, can control any suitable one or more settings (e.g., temperature, speed, orientation, etc.) of the components (e.g., numerical control code generator 110, image sensor 120, light source 130, print head 140, build plate 150, image generator 170, and image analyzer 180) of additive manufacturing system 100, as well as communications, operations (e.g., capturing images of the printed object, enabling light source 130, etc.), and calculations performed by, and between, components of the additive manufacturing system. Control system 108 can include any suitable hardware (which can execute software in some embodiments), such as, for example, computers, microprocessors, microcontrollers, application specific integrated circuits (ASICs), field-programmable gate arrays (FGPAs), and digital signal processors (DSPs) (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements. In some embodiments, individual components within additive manufacturing system 100 can include their own software, firmware, and/or hardware to control the individual components and communicate with other components in additive manufacturing system 100.

In some embodiments, communication between control module 160 and other components of additive manufacturing system 100, and/or communication between control module 160 and other components within additive manufacturing printer 115, can use any suitable communication technologies, such as analog technologies (e.g., relay logic), digital technologies (e.g., RS232, ethernet, or wireless), network technologies (e.g., local area network (LAN), a wide area network(WAN), the Internet), Bluetooth technologies, Near-field communication technologies, Secure RF technologies, and/or any other suitable communication technologies.

In some embodiments, operator inputs can be communicated to control module 160 using any suitable input device (e.g., a keyboard, mouse or joystick).

In addition to the components shown in FIG. 1, additive manufacturing printer 115 can also include other components, for example, a temperature sensor, a humidity sensor, an accelerometer for measuring acceleration and any unintended motion of print head 140 (such as a jolt, shudder etc.), and a display monitor for displaying images. Additive manufacturing printer 115 can also include one or more actuators for orienting and/or moving image sensor 120, illumination source 130, print head 140, and/or build plate 150.

FIG. 1 also shows numerical control code generator 110. In some embodiments, numerical control code generator 110 can be configured to receive a three-dimensional design (e.g., a Computer Aided Design (CAD) model) (referred to herein as a "production design") of an object to be printed. The production design can be received in any suitable format (e.g., standard tessellation language (.stl), drawing standard (DWS), or drawing (DWG) file formats) that can be processed by numerical control code generator 110.

Numerical control code generator 110 can be configured to translate a production design into instructions for additive manufacturing printer 115 to print a physical representation of the production design. In some embodiments, numerical control code generator 110 can include an interface for an operator to enter certain print parameters as described in connection with FIG. 3. Print parameters can also include, but are not limited to, one or more of: print features of additive manufacturing machine 115 (e.g., print head size, type of filament extruded, 3D printing technique, etc.); print path; filament feed rate; and specifications of a production design (e.g., what a printed design should look like, desired mechanical, optical and/or electrical properties of the design, etc.).

Based on one or more print parameters, numerical control code generator 110 can apply a slicing algorithm to intersect a production design with parallel planes that are spaced apart at a predetermined distance in a Z direction to create two-dimensional or three-dimensional layers. For example, if an object to be printed is 5 mm in the Z direction and the desired layer thickness is 0.2 mm in the Z direction, then the production design of the object can be sliced into 25 layers that are 0.2 mm thick in the Z direction. In addition to slicing a production design, numerical control code generator 110 can be further configured to generate numerical control code for each layer to be printed based on one or more: print parameters; AIPC from one or more prior printed layers of a printed object that is currently printing; AIPC from other printed objects (some of which may be incorporated into the production design); and print features of additive manufacturing printer 115.

In other embodiments, the slicing algorithm can be configured to determine a first layer only and to generate numerical control code for that first layer. The numerical control code for each subsequent layer of a printed object can be generated based on one or more of: AIPC from one or more prior printed layers of a printed object that is currently printing; AIPC from other printed objects (some of which may be incorporated into the production design); desired mechanical, optical and/or electrical properties and specifications for the production design of the printed object; and input parameters entered by an operator and/or print features of the additive manufacturing printer 115. In some embodiments, the slicing algorithm can be omitted altogether and the numerical control code can be generated based on one or more of: AIPC from other printed objects (some of which may be incorporated into the production design); desired mechanical, optical and/or electrical properties and specifications for the production design of the printed object; input parameters entered by an operator; and/or print features of the additive manufacturing printer 115. In some embodiments, the numerical control code generator can also consider non-controllable variables (i.e., variables that are non-controllable without human intervention), for example, including, but not limited to, ambient humidity, temperature and light exposure, voltage variation, wear and tear of additive manufacturing printer 115, and the total filament supply available to print head 140.

FIG. 3 illustrates an example interface 300 for an operator to input print parameters into numerical control code generator 110 according to some embodiments of the disclosed subject matter.

Note that interface 300 can include fields to control other suitable print parameters that are not shown. Additionally or alternatively, some of the print parameters included in interface 300 can be omitted in some embodiments. Further, any and all print parameters included in interface 300 can alternatively be generated automatically by the numerical control code generator and not be inputted by an operator. In some embodiments, an operator can input print parameters for the first layer of a production design, and numerical control code generator 110 can use artificial intelligence algorithms and other methods disclosed herein to generate print parameters for subsequent layers of the printed design.

As shown, interface 300 can include fields to control print quality parameters like layer height, shell thickness, and retraction.

Layer height refers to the height of a layer of a printed object. The height of a layer can affect printing resolution. For example, a short layer can create a more detailed print and a smoother surface than a taller layer. However, an object with shorter layers can take longer to print. Conversely, a taller layer can correspond to a lower resolution print and a rougher surface. An object comprising tall layers may be printed more quickly than the same object with shorter layers. Any suitable layer height can be used in some embodiments.

Shell thickness refers to the thickness of the outer walls of a printed object. Any suitable shell thickness can be used in some embodiments.

Retraction refers to ensuring that no filament is extruded from a print head when the print head moves over an area where there is no print specified. In some embodiments, retraction can be enabled or disabled.

Interface 300 can also include fields to control print speed settings for controlling print head speed and/or build plate speed. Print speed refers to how fast a print head and/or a build plate moves when the print head prints. Any suitable print speed can be used in some embodiments. Based on the print speed, the amount of material that needs to be extruded (i.e., the feed rate) can be calculated. Any suitable feed rate can be used in some embodiments.

Interface 300 can also include fields to control temperature settings for controlling print head temperature and/or build plate temperature. It may be necessary to change the temperature of the print head when the print speed changes in order to ensure that the extruded filament is sufficiently heated for deposition. Any suitable print head temperature can be used in some embodiments.

Interface 300 can also include fields to control infill density and infill pattern settings.

Infill density refers to the structure that is printed inside an object and can be specified, for example, by percentage. Any suitable infill density can be used in some embodiments. 100% infill density refers to a solid infill density without intended gaps.

Infill pattern refers to the pattern of the infill. Any suitable infill pattern(s) can be used in some embodiments. For example, in some embodiments, infill patterns can include honeycomb, triangular, grid, and rectangular. Infill density and infill pattern can influence print weight, printed object strength, total print time, and external properties. Infill pattern can also influence mechanical, optical and/or electrical properties. The infill density and infill pattern can be set for a particular layer or for an entire object in some embodiments.

Further, interface 300 can include fields to control support settings including support type and platform adhesion type. Some printed objects may have overhanging parts and therefore may need support to prevent the extruded filament from falling down during the printing process. The support settings can be used to specify where the support can be placed. Any suitable support settings can be use in some embodiments.

Platform adhesion settings can be used to improve adhesion of a printed layer to build plate 150. Different types of platform adhesion settings that can be specified include: a raft setting which adds extra filament in the form of a thick grid between the base layer of a printed object and a build plate; a brim setting that adds extra lines of filament around a first layer of a printed object; and a skirt setting that adds a line of filament around an object on a first printed layer. Using certain platform adhesion settings can help decrease the amount of warping in a printed object. Any suitable platform adhesion settings can be used in some embodiments.

Interface 300 can also include fields settings related to object placement and orientation. These settings include the location of the printed object on build plate 150, as well as the orientation of the printed object on build plate 150. Any suitable object placement and/or orientation settings can be used in some embodiments.

In some embodiments, generated numerical control code can describe a print path for the relative movement of print head 140 and/or build plate 150. The print path can be defined by two sets of coordinates in X-Y-Z dimensions (setpoints), as well as instructions specifying a manner of moving between the setpoints. The generated numerical control code can specify a speed of movement of print head 140 and/build plate 150 with respect to the other while moving between a pair of consecutive points along the print path, a temperature of the filament (or the temperature of the print head nozzle) between a pair of consecutive points, and/or a feed rate of the filament between a pair of consecutive points. Generated numerical control code can specify where print head 140 should extrude filament, and/or where it should refrain from releasing filament. All the parameters included in the generated numerical control code are also considered "print parameters."

One or more of the print parameters described above, as well as non-controllable variables, can affect properties of a printed object, such as layer anomalies, surface roughness, print resolution, total build time, amount of extruded material used for the printed object, and the mechanical, optical and/or electrical properties of the printed object. Mechanical properties can include maximum tensile strength ($R_m$), yield strength ($Rp_{2\%}$), elongation at break ($A_{\%}$), Young's modulus (E), fatigue ($\sigma_d$), Poisson's ratio, mass, and specific gravity. Optical properties can include absorption, reflection, transmission, and refraction. Electrical properties can include electrical resistivity and conductivity. The disclosed mechanical, optical, and electrical properties are just examples and are not intended to be limiting.

AIPC can be used to optimize for desired mechanical properties, optical properties, electrical properties, and/or any suitable characteristics of an object being printed. AIPC can also be used to take corrective action when printing an object. The corrective action can include changing print parameters of a next layer or targeted future layers of an object that is currently in print. In some embodiments, AIPC can be used to improve upon a production design.

As show in FIG. 1, additive manufacturing system 100 can include image generator 170 that can process captured images and/or video of the printed layers of an object. In some embodiments, image generator 170 can include hardware or software configured for storing captured images and/or video and for generating a three-dimensional topography images of the printed layer(s), and/or other suitable images, from the captured images and/or video.

Different topographical imaging techniques can be used (including but not limited to, shape-from-focus algorithms, shape-from-shading algorithms, photometric stereo algorithms, and Fourier ptychography modulation algorithms) with a predefined size, number, and position of illuminating light to generate one or more three-dimensional topography images of each printed layer. The generated topographical images can provide volumetric information related to completed layers of a printed object and/or partially printed object, overall dimensions of each layer of a printed object and/or partially printed object, features of each layer of a printed object and/or partially printed object, and information regarding anomalies (such as amount, distribution, anomaly type, etc.) found on one or more layers of a printed object and/or partially printed object.

An example of a shape-from-focus algorithm that can be adapted for use by image generator 170 in additive manufacturing system 100 is described by Said Pertuz et al., "Analysis of Focus Measure Operators for Shape-from-Focus," Pattern Recognition, vol. 45, issue 5, pp. 1415-1432, which is hereby incorporated by reference herein in its entirety. The disclosed method is just an example and is not intended to be limiting.

An example of a shape-from-shading algorithm that can be adapted for use by image generator 170 in additive manufacturing system 100 is described by Byungil Kim et al., "Depth and Shape from Shading using the Photometric Stereo method," CVGIP: Image Understanding, vol. 54, no. 3, pp 416-427, 1991, which is hereby incorporated by reference herein in its entirety. The disclosed method is just an example and is not intended to be limiting.

An example of a photometric stereo algorithm that can be adapted for use by image generator 170 in additive manufacturing system 100 is described by Jose R. A. Torreao, "Estimating 3-D Shape from the Optical Flow of Photometric Stereo Images," Proceedings of the 6th Ibero-American Conference on AI: Progress in Artificial Intelligence (IBERAMIA 1998), Helder Coelho (Ed.), Springer-Verlag, London, UK, UK, 253-261, which is hereby incorporated by reference herein in its entirety. The disclosed method is just an example and is not intended to be limiting.

An example of a Fourier ptychography modulation algorithm that can be adapted for use by image generator 170 in additive manufacturing system 100 is described by Guoan Zeng et al. "Wide-field High-resolution Fourier Ptychographic Microscopy," Nature Photonics, vol. 7, pp. 739-745, 2013, which is hereby incorporated by reference herein in its entirety. The disclosed method is just an example and is not intended to be limiting.

Figure 4:
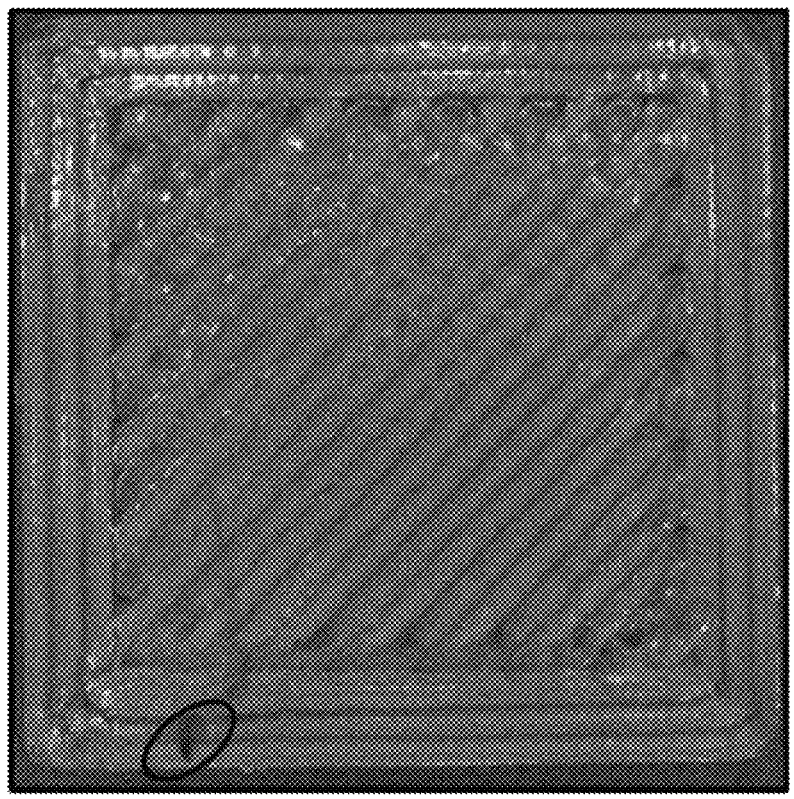
FIG. 4 is an example of an image of a printed layer showing an unintended gap in the deposited filament that can be captured in accordance with some embodiments.
Figure 5C:
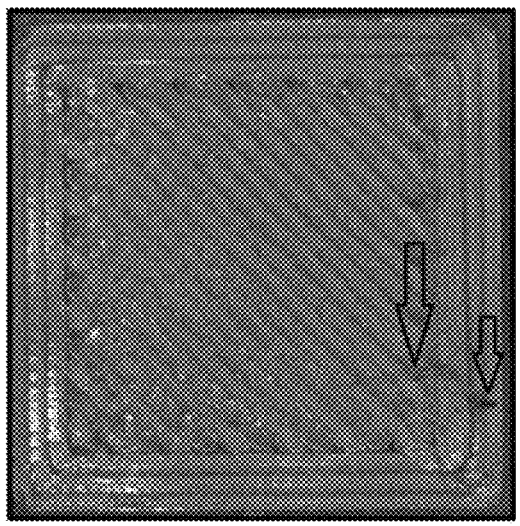
FIGS. 5A, 5B, and 5C are examples of images of various printed layers showing unintended thread-like artifacts and other disruptions in a printed layer that can be captured in accordance with some embodiments.
Figure 5B:
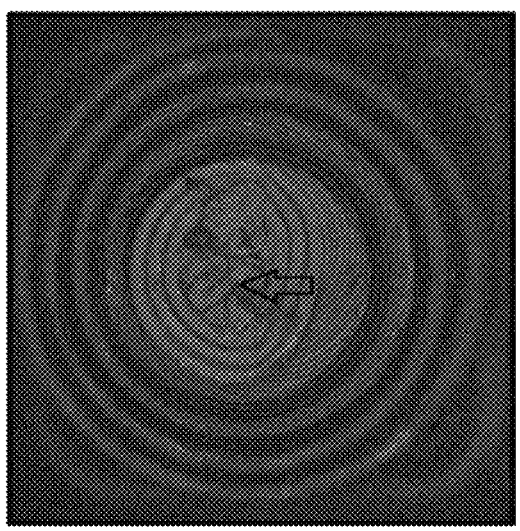
Figure 5A:
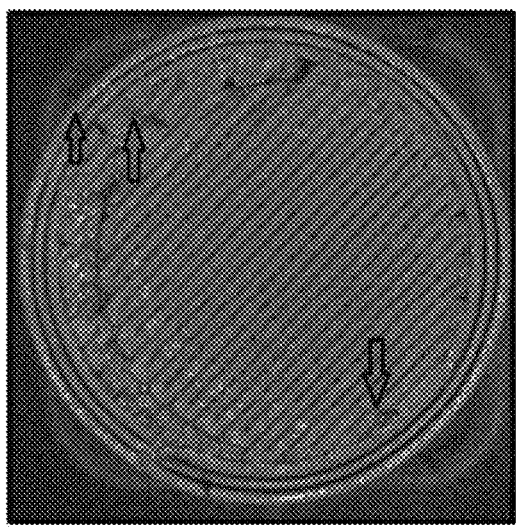

In some embodiments, topographical images and/or other suitable images generated by image generator 170 can provide information such as anomaly rate and distribution, anomaly type, deposited filament at various points along a print path, etc. For example, as shown in FIG. 4, captured image 400 of a printed layer shows an unintended gap in the deposited filament. In another set of examples, as shown in FIGS. 5A, 5B, and 5C, the captured images of various printed layers show unintended thread-like artifacts and other disruptions in the printed layer.

In some embodiments, image analyzer 180 can be configured to receive generated topographical images and/or other suitable images from image generator 170 and visually recognize and identify one or more anomalies on a printed layer. In some embodiments this can be done by comparing the following to identify differences: actual features of a printed layer as obtained from a two-dimensional or three-dimensional topographical image, a detected print path map of the printed layer, and/or an image of the layer; and features of the printed layer, as specified in generated numerical code and/or a production design for the layer. In some embodiments, one or more artificial intelligence algorithms can be used to identify anomalies based on the differences. These anomalies can include, for example differences between an actual printed layer and production design and/or generated numerical code for the printed layer with respect to: the perimeter dimensions of the layer; the dimensions of deposited filament between setpoints; infill density; infill pattern; surface roughness; the print path; and/or any other variation. The identification of the anomaly can include classifying the anomaly, as well as identifying its size, shape, X-Y-Z location, and/or any other suitable characteristic. In some embodiments, any suitable artificial intelligence algorithm(s) can be used. For example, in some embodiments, the artificial intelligence algorithms can include one or more of the following, alone or in combination: machine learning; hidden Markov models; recurrent neural networks; convolutional neural networks; Bayesian symbolic methods; generative adversarial networks; support vector machines; and/or any other suitable artificial intelligence algorithm.

In some embodiments, image analyzer 180 can classify the topographical images and/or other suitable images from image generator 170 utilizing a mathematical model that reduces the complexity of a standard Convolutional Neural Network (CNN) model, such as shown in and described below in connection with FIG. 9. This reduction in complexity is especially useful when deploying to a low-cost, rapid prototyping, additive environment, because onboard Graphics Processing Units (GPUs) and high-performance Central Processing Unit (CPU) computers are not required. In some embodiments, for example, image analyzer 180 can deploy an image classification model to classify images during a 3D printing process to detect unrecoverable failures (e.g., a printed layer cannot be printed on further) and assign quality metrics to layers being printed, as shown in and described below in connection with FIG. 9. This model may include a failure classifier and an extrusion classifier, and, in some embodiments the results of the failure classifier may be provided to the extrusion classifier.

As described below in more detail in connection with 920 of FIG. 9, the failure classifier may be a binary classifier, which takes an input, such as an image, and determines one of two output values: passing or failing. In some embodiments, during the 3D printing process, an image of the most recent layer of the object being printed is captured and a version of the image with lower resolution than the image initially captured can be generated and provided to the failure classifier. Based on the lower resolution image, the failure classifier determines if the layer printed is capable of being further printed on. If the layer cannot be printed on because the part has detached from the heat bed, for example, the failure classifier can classify the image as failing. If the layer can be printed on, the failure classifier can classify the image as passing. In some embodiments, in order to reduce the occurrence of false positives, the failure classification can be further analyzed using a second order filter, such as described below in more detail in connection with 920 of FIG. 9. By detecting unrecoverable failures early in the print process, the print job may be stopped prior to completion, saving time and resources. In some embodiments, the failure classifier can be used to stop the entire job or a single part, in a multi-part printing process.

As described below in more detail in connection with 940-970 of FIG. 9, in some embodiments, cropped versions of the low-resolution images that have been classified as passing by the failure classifier may be provided to the extrusion classifier. In some embodiments, the low-resolution image can be cropped to be centered on a region of interest. In some embodiments, the extrusion classifier may comprise a binary pre-classifier and a group of CNNs. In some embodiments, the binary pre-classifier of the extrusion classifier can determine if there is a printing error present in the cropped version of the low-resolution image, as described below in more detail in connection with 940 of FIG. 9. If the image is classified as showing a printing error, then the uncropped image at full resolution that was originally captured during the 3D printing process is fed into a group of CNNs. In some embodiments, the group of CNNs collectively analyze the quality of the image based on the pattern of the printed layer that is characteristic of the extrusion quality, and then can assign the image an extrusion quality score based on a specified set of characteristics that are associated with extrusion quality that are measured and weighted according to a predefined formula, as described below in more detail in connection with 970 of FIG. 9. In some embodiments, an extrusion quality score may be used to guide a reinforcement learning agent to adjust the printing parameters to correct the printing process, for example, such as shown in and described below in connection with FIGS. 10 and 11. If the binary pre-classifier determines that there is no error in the printing pattern of a layer shows in an image, then the print job can continue without any modifications.

This process of filtering out images that have been classified as failing or not having a printing error allows the group of CNNs in the extrusion classifier to only classify images that are captured of layers in the object being 3D printed that are candidates for being corrected, which minimizes the computational resources that are needed. Additionally, building the failure classifier to use a low resolution image and the binary pre-classifier of the extrusion classifier to use a low resolution, cropped image, allows for the full size, full resolution image to only be used by the group of CNNs in the extrusion classifier, further minimizing the computational resources needed.

Figure 9:
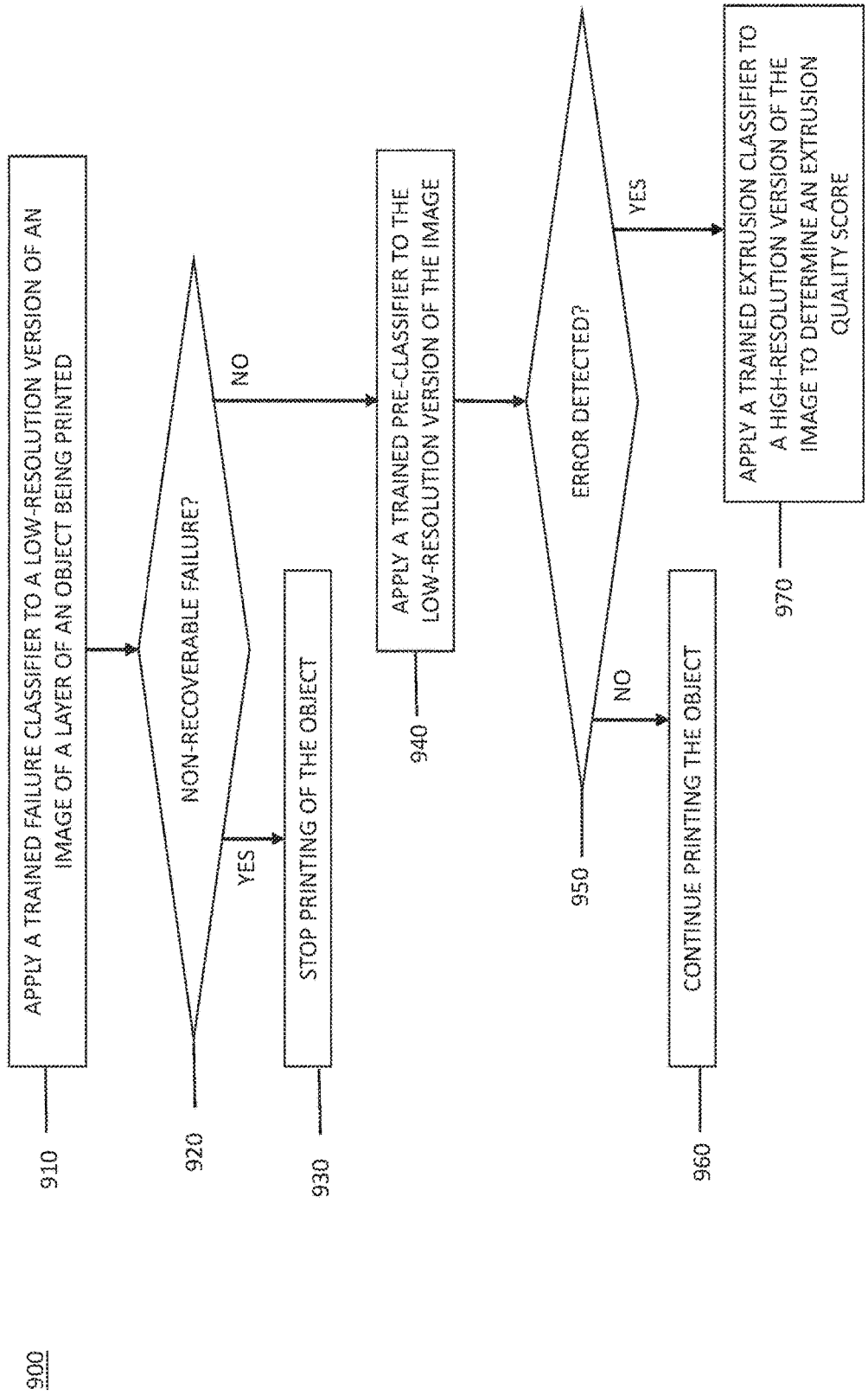
FIG. 9 shows an example process for applying classifiers that identify non-recoverable failures and errors in a printed object during printing in accordance with some embodiments of the subject matter.

Turning to FIG. 9, an example 900 of a process for identifying a non-recoverable failure and/or determining a quality score using a failure classifier and an extrusion classifier are shown in accordance with some embodiments of the disclosed subject matter. In some embodiments, process 900 can be executed by image analyzer 180 during printing of an object.

At 910, process 900 can apply a trained failure classifier to a low-resolution version of an image of a layer of an object being printed. In some embodiments, the low-resolution version of the image can be generated from an original image in any suitable manner.

Figure 6:
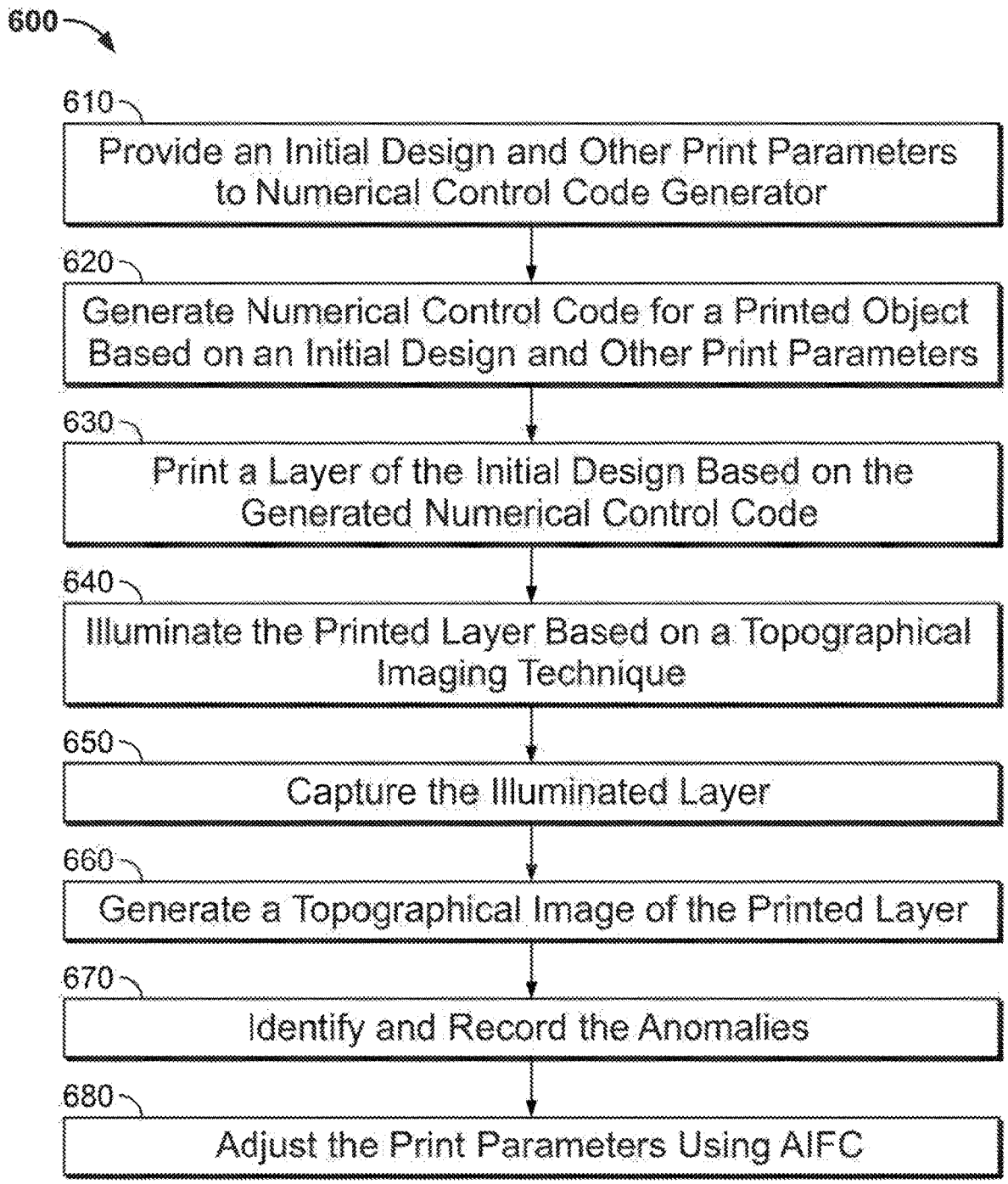
FIG. 6 is an example of an additive manufacturing printing operation (at a high level) in accordance with some embodiments.

Note that, in some embodiments, the original image can be captured in any suitable manner, such as by using a camera associated with a 3D printer, as shown in and described above in connection with FIG. 1 and blocks 640 and 650 of FIG. 6.

In some embodiments, the failure classifier can be a CNN with any suitable topology. For example, in some embodiments, the CNN can have any suitable number of convolution/max-pooling layers (e.g., two, three, five, and/or any other suitable number) for feature learning. As another example, in some embodiments, the CNN can have a fully-connected layer with dropout that follows the convolution/max-pooling layers. As yet another example, in some embodiments, the CNN can have a fully-connected layer prior to an activation function (e.g., a softmax activation, and/or any other suitable activation function) that provides a classification result. In some embodiments, the classification result provided by the failure classifier can have two classification classes: pass or fail.

In some embodiments, the failure classifier can be trained in any suitable manner. For example, in some embodiments, a training set can be constructed with any suitable training samples. As a more particular example, in some embodiments, a training set can be generated using images of each layer of a printed object. Continuing with this particular example, in an instance in which a printed object has a 500 layers, and in which a printing failure is located at layer N, the training set can include 500 images (numbered 0 through 499) (i.e., one image per layer), with N images (i.e., images corresponding to the layers prior to the printing failure) classified as passing and 500-N images (i.e., images corresponding to the layers after the printing failure) classified as failures. In some embodiments, the training set can be used to train the failure classifier using any suitable technique or combination of techniques.

At 920, process 900 can determine whether there has been a non-recoverable failure. In some embodiments, process 900 can determine whether there has been a non-recoverable failure based on the classification determined by the failure classifier. For example, in some embodiments, process 900 can determine whether a likelihood associated with a classification of failure exceeds a predetermined threshold (e.g., 0.8, 0.9, and/or any other suitable likelihood). Note that, in some embodiments, process 900 can determine whether there has been a non-recoverable failure based on the result $e_f$ of the second order filter described above in connection with 910.

If, at 920, process 900 determines that there has been a non-recoverable failure ("yes" at 920), process 900 can stop printing of the object at 930.

If, at 920, process 900 determines that there has not been a non-recoverable failure ("no" at 920), process 900 can apply a trained pre-classifier to the low-resolution version of the image. In some embodiments, the pre-classifier can determine whether the image is a candidate to be analyzed to determine an extrusion error using an extrusion classifier, as described below in connection with 970. In some embodiments, the pre-classifier can be a binary pre-classifier with two classification classes corresponding to error detected or no error detected. In some embodiments, the pre-classifier can use the low-resolution image to determine whether the image is to be further analyzed (e.g., in response to determining that an error has been detected) by the extrusion classifier. In some embodiments, by applying the extrusion classifier to images associated with errors detected by the pre-classifier, the extrusion classifier can be trained to be highly sensitive to variations in extrusion value. Additionally, in some embodiments, by using an extrusion value generated by the extrusion value trained on high-resolution images, a printing process that modifies a parameter based on the extrusion value can operate with relatively high precision.

In some embodiments, the pre-classifier can use a cropped version of the low-resolution version of the image. In some such embodiments, the low-resolution version of the image can be cropped to any suitable size (e.g., 200×200, 150×150, and/or any other suitable size). In some embodiments, the low-resolution version of the image can be cropped around a centroid of the image based on the infill of the extruded layer. Note that, in some embodiments, the cropped version of the low-resolution version of the image can include a mesh pattern or another printed pattern which is characteristic of the extrusion value. In some embodiments, any other suitable augmentation technique(s) can be applied, such as rotation, mirroring, and/or any other suitable image augmentation technique(s).

In some embodiments, the pre-classifier can have any suitable topology. For example, in some embodiments, the pre-classifier can be a CNN. As a more particular example, in some embodiments, the pre-classifier can be a CNN having the same topology as the failure classifier described above in connection with 910. In some embodiments, the pre-classifier can be trained in any suitable manner, such as by training the pre-classifier using any suitable training set of training images. In some embodiments, training images included in the training set can be obtained by capturing images of different layers of an object during printing with errors corresponding to different scaled extrusion commands injected into the print at the different layers, such that errors corresponding to different extrusion values are included in the training set. In some embodiments, the pre-classifier can be trained using any suitable technique(s) for training a CNN.

At 950, process 900 can determine whether an error has been detected. In some embodiments, process 900 can determine whether an error has been detected based on the classification determined by the pre-classifier. For example, in some embodiments, process 900 can determine whether a likelihood associated with a classification of an error detected exceeds a predetermined threshold (e.g., 0.8, 0.9, and/or any other suitable likelihood), and, in response to determining that the likelihood of an error detected exceeds the predetermined threshold, can determine that an error has been detected. Conversely, in some embodiments, in response to determining that the likelihood associated with a classification of no error exceeds a predetermined threshold (e.g., 0.8, 0.9, and/or any other suitable likelihood), process 900 can determine that no error has been detected.

If, at 950, process 900 determines that no error has been detected ("no" at 950), process 900 can continue printing the object at 960.

If, at 950, process 900 determines that an error has been detected ("yes" at 950), process 900 can apply a trained extrusion classifier to a high-resolution version of the image to determine an extrusion quality score at 970. In some embodiments, the original image can be used as an input to the extrusion classifier. Alternatively, in some embodiments, a window of the original image, where the window is at the original, or higher resolution, can be used as an input to the extrusion classifier. In some such embodiments, the window can correspond to the centroid used by the pre-classifier such that the window includes a high-resolution image of the characteristic printed pattern (e.g., a mesh pattern) that indicates a quality of the extrusion.

In some embodiments, the extrusion classifier can have any suitable topology. For example, in some embodiments, the extrusion classifier can be an ensemble of any suitable number of base learners (e.g., three, four, five, and/or any other suitable number), where each base learner is a CNN. As a more particular example, in some embodiments, the extrusion classifier can have four CNNs each corresponding to a base learner. In some embodiments, each CNN can have any suitable number of convolutional layers (e.g., two, three, four, five, and/or any other suitable number of convolutional layers). As a more particular example, in some embodiments, in an instance in which the extrusion classifier has four CNNs, the four CNNs can have two, three, four, and five convolutional layers, respectively. In some embodiments, each CNN can include two fully connected layers. In some embodiments, an average of the probabilities generated by each CNN can be calculated, and the average can be used to classify the image using a distribution of the probabilities.

In some embodiments, the extrusion classifier can be trained in any suitable manner. For example, in some embodiments, the extrusion classifier can be trained using any suitable technique(s) used for training a CNN. As another example, in some embodiments, the extrusion classifier can be trained using any suitable training parameters, such as any suitable filters with any suitable values (e.g., 16, 128, 256, 512, 1024, and/or any other suitable values), any suitable learning rate (e.g., 0.0001, 0.0005, and/or any other suitable learning rate), any suitable batch size (e.g., 8, 16, and/or any other suitable batch size), any suitable number of epochs (e.g., 50, 100, and/or any other suitable number), and/or any suitable number of raw training images (e.g., 8000, 8400, 9000, and/or any other suitable number).

Note that, in some embodiments, the extrusion quality score determined by the extrusion classifier can be used for any suitable purpose. For example, in some embodiments, the extrusion quality score can be used to modify a printing parameter, such as an extrusion velocity, an extrusion volume, a rate of motion of an extruder head, a temperature of an extruder nozzle, and/or any other suitable parameter. In some embodiments, the extrusion quality score can be provided as an input to a reinforcement learning agent that modifies a printing parameter during printing of an object, such as shown in and described below in connection with FIGS. 10 and 11. In some embodiments, image analyzer 180 can be preprogrammed to recognize certain anomalies (e.g., unintended gaps or curled edges, warped or uneven patterns, points of excessive extrusion, thread-like or other foreign artifacts and/or any other disruption in the printed layer) in a received image of a printed layer. Based on the preprogrammed anomalies, image analyzer 180 can process a generated image for a completed print layer to determine whether the processed image includes any anomalies similar to the preprogrammed anomalies and identify one or more locations for any such anomaly on a printed layer.

In some embodiments, image analyzer 180 can be further configured to determine and record a correlation between a detected anomaly and one or more print parameters. For example, by using a suitable artificial intelligence algorithm, the image analyzer can determine one or more print parameters that may correlate with a detected anomaly. For example, image analyzer 180 may discover the following example correlations: disruptions occur when a print head is at certain temperatures and not at others; certain print speeds, and not others, cause a high number of unintended gaps; and certain infill patterns, at certain locations in an object, cause a certain type of anomaly.

In some embodiments, in response to detecting a correlation between a detected anomaly and one or more print patterns, image analyzer 180 can provide information, data, and/or instructions which alter the manner in which one or more layers of an object being printed or one or more objects to be printed in the future are printed. For example, in some embodiments, the image analyzer can communicate the discovered correlations and/or instructions for adaptively adjusting print parameter settings to numerical control code generator 110, control module 160 and/or to any other device. The numerical control code generator 110 and/or control module 160 can then use the information to make adjustments to the print parameters in the numerical control code for any subsequent layers of an object that is currently being printed. In some embodiments, print parameters can be adjusted so that a next layer or any future layer compensates for anomalies found in a prior layer. For example, if an unintended gap is detected in a print layer, the numerical control code for the next layer can include instructions to fill the gap when depositing the filament located above the gap. In another example, when an unintended gap is found in a lower portion of an object, the numerical control code for a symmetrical layer in the upper portion of an object can include instructions to compensate for the gap.

In some embodiments, image analyzer 180 can be configured to measure mechanical, optical and/or electrical characteristics of a completed printed object.

In some embodiments, image analyzer 180 can be configured to detect a correlation between one or more print parameters and fewer anomalies in a printed layer and/or a completed printed object. In further embodiments, image analyzer 180 can be configured to detect a correlation between one or more print parameters and the measured mechanical, optical and/or electrical properties of a completed printed object. In response to detecting one or more such correlations, image analyze can provide information, data, and/or instructions which alter the manner in which one or more layers of an object being printed or one or more objects to be printed in the future are printed. In some embodiments, image analyzer 180 can provide information, data, and/or instructions, for example to a three-dimensional modeling software, to improve upon a production design.

In further embodiments, image analyzer 180, for example, may use reinforcement learning models to adapt and adjust printing parameters during the 3D printing process to optimize mechanical properties of a final printed object, as shown in and described below in connection with FIGS. 10 and 11. In some embodiments, in an effort to minimize associated computation times for training a reinforcement learning model to identify corrective actions to perform to improve mechanical properties in a final product (e.g., tensile strength), a set of possible conditions of an environment and corresponding actions that can be taken (generally referred to herein as the state/action space) may be reduced or limited. In some embodiments, the state/action space can be limited by selecting the number of input variables involved and/or by selecting potential outputs based on their usefulness. For example, in some embodiments, to optimize the ultimate tensile strength of 3D printed specimen, the state/action space may be reduced by only considering actions related to print parameters that impact tensile strength by a relatively large degree, such as changing the volume of the deposited material during the printing process, the extruder nozzle temperature, the volume of extruded plastic, the motion dynamics of the print head, the ambient environmental conditions, and the material properties of the extruded thermoplastic. In some embodiments, by limiting available actions and corresponding states of the environment, the mechanisms described herein can produce results that can be utilized for further analysis while minimizing computational resources.

In some embodiments, image analyzer 180 can use generated topographical images, and/or other generated images, for a printed layer, as well as generated numerical control code for the printed layer, to learn a relationship between non-controllable variables (i.e., variable that are non-controllable without human intervention) and the resulting print head motion, as well as the anomalies (e.g., unintended gaps or curled edges, warped or uneven patterns, points of excessive extrusion, deviations from the print path specified in the numerical control code, unintended thread-like or other foreign artifacts and/or any other disruption in the printed layer) in a deposited layer. In response to detecting a correlation between non-controllable variables and the resulting print head motion, as well as anomalies, image analyzer 180 can provide information, data, and/or instructions which alter the manner in which one or more layers of an object being printed or one or more objects to be printed in the future are printed.

In some embodiments, information on the correlations can be used to train one of more AI mechanisms as described herein.

In some embodiments, after a layer is printed, image analyzer 180 can be configured to compare the completed printed layer with one or more prior layers to detect and record anomalies, to compare and record anomaly rates and patterns, and to provide instructions to numerical control code generator 110 and/or control module 160 to adjust the print parameters to optimize an overall design of the object (e.g., to obtain the desired mechanical, optical and/or electrical properties or to achieve a printed design that closely resembles the production design) or to optimize the operation of the print job (e.g., speed-up deposition rate, or minimize the amount of material needed). The comparison between a completed layer and previous layers to identify anomalies can also be used to better assign causality to the print parameters of the additive manufacturing system 100 and to make appropriate adjustments for the next or any subsequent layers of a partially printed object, as well as to optimize future print jobs of a similar or different object.

In some embodiments, image analyzer 180 can be configured to analyze the overall anomaly rate for the current and/or prior layers of a partially printed object, and based on AIPC from similar print jobs, provide instructions to the numerical control code generator 110 and/or control module 160 to adjust the print parameters for the next and/or any future layers of the partially printed object to obtain the desired mechanical, optical and/or electrical properties.

In some embodiments, after a layer is printed, an algorithm, not based on artificial intelligence, can be used to identify anomalies that are related to the particular calibration of the specific additive manufacturing printer being used. Appropriate adjustments can be made to the numerical control code for subsequent layers and future print jobs to account for the calibration of the specific additive manufacturing printer.

In some embodiments, if the anomalies in a printed layer or layers exceed certain predetermined tolerances, then the print job for the printed object can be stopped prior to completion. Data collected for the failed print job can provide information, data, and/or instructions to numerical control code generator 110, control module 160 and/or any computer system collecting training data related to print processing performed by additive manufacturing printer 115.

In some embodiments, image analyzer 180 can be further configured to send anomaly data (e.g., the distribution, pattern and rate of anomalies) for a printed object, as well as automatically recommended print adjustments to a three-dimensional modeling software to eliminate or modify structures in the design corresponding to the anomalies.

FIG. 6, with further reference to FIGS. 1-3, shows at a high level, an example of an additive manufacturing printing operation using AIPC, in accordance with some embodiments of the disclosed subject matter. In some embodiments, additive manufacturing process 600 can use additive manufacturing system 100.

At 610, a production design specifying what a printed object should look like, as well as desired mechanical, optical and/or electrical properties for the printed object are provided to numerical control code generator 110. In some embodiments, some initial print parameters are entered by an operator. In some embodiments, a production design is provided to numerical control code generator 110, and image analyzer 180, using AIPC, determines desired mechanical, optical and/or electrical properties for the production design.

In some embodiments, an operator can input a set of rules for image analyzer 180 to resolve conflicting goals during the additive manufacturing printing process. For example, a user can specify that achieving optimal mechanical properties of a printed object should be prioritized over: print speed; integrity to the production design; and reducing the amount of filament used. An operator can also specify what mechanical, optical and/or electrical properties are most important for a printed object, so that image analyzer 180 can provide instructions for adjusting print parameters that optimize for those mechanical, optical and/or electrical properties.

Figure 7A:
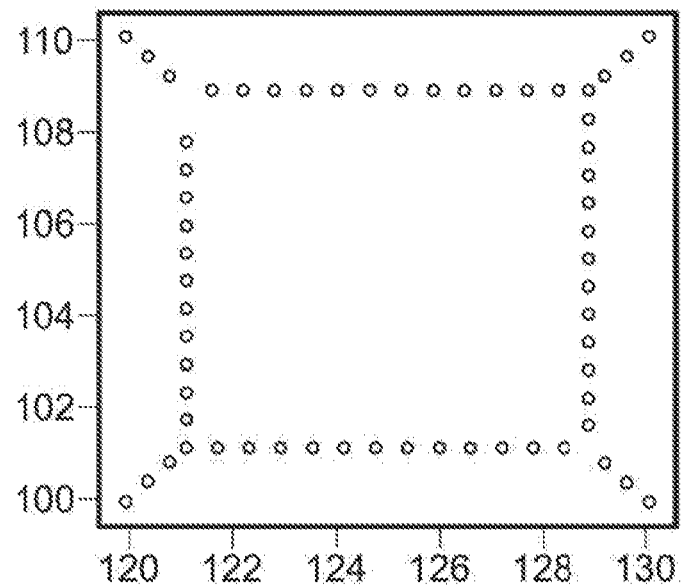
FIG. 7A is an example of a simulation of a set of setpoints for a printed layer that might be included in numerical control code in accordance with some embodiments.
Figure 7B:
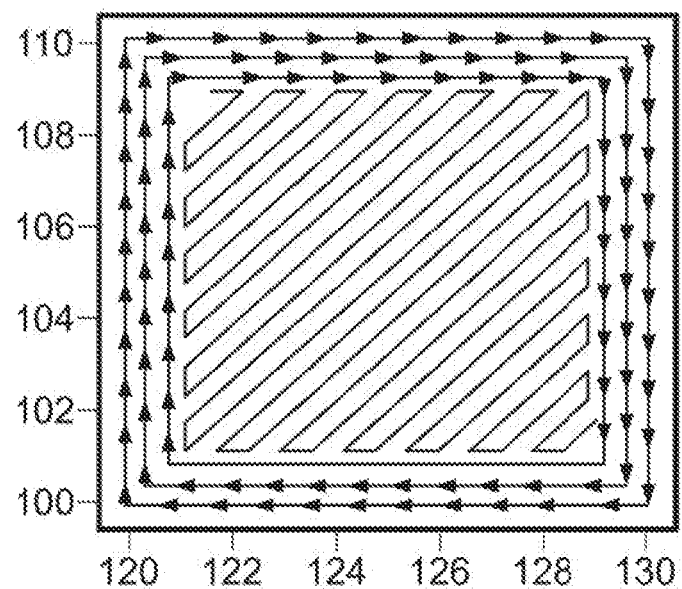
FIG. 7B is an example of a simulation of what a traversed print path might look like in accordance with some embodiments.

At 620, numerical control code generator 110 can generate numerical control code for a layer of a printed object based on one or more of: input parameters entered by an operator, the print features of additive manufacturing printer 115; the specifications of the production design (including mechanical, optical and/or electrical properties); AIPC from one or more prior printed layers of the partially printed object and/or AIPC from other printed objects. The generated numerical control code can include a set of setpoints (e.g., a plurality of X-Y-Z coordinates) for print head 140 and/or build plate 150 to traverse. FIG. 7A shows an example simulation of a set of setpoints for a printed layer that might be included in the numerical control code. The generated numerical control code can also include instructions defining how the print head and/or build plate should traverse the individual setpoints. An example simulation of what a traversed print path might look like, based on the included instructions, is shown, for example, in FIG. 7B.

In some embodiments, the generated numerical control code can also specify certain print parameters, including but not limited to, a speed of print head 140 and/or build plate 150 between setpoints, a temperature of the nozzle of print head 140 and/or build plate 150 between setpoints, an amount of filament deposited between setpoints, an infill density between setpoints, and an infill pattern between setpoints.

At 630, print head 140 can deposit filament for a layer of a production design according to instructions provided by numerical control code generator 110 and/or control module 160.

At 640, light source 130 can illuminate the printed layer based on a specified topographical imaging technique and/or other imaging technique (as described above).

At 650, image sensor 120 can capture an image of the illuminated printed layer.

At 660, image generator 170 can generate one or more topographical images, and/or any other suitable image(s), of the printed layer based on the images captured by image sensor 120. In some embodiments, the generated image(s) of the printed layer can comprise a series of captured images that are tiled or stitched together.

In further embodiments, the actual print path for the printed layer can be determined from the one or more topographical images, and/or other suitable images generated by image generator 170.

At 670, image analyzer 180 can use the generated topographical images, and/or other generated images, for the printed layer, as well as the generated numerical control code for the printed layer, to determine and record the anomalies (e.g., unintended gaps or curled edges, warped or uneven patterns, points of excessive extrusion, deviations from the print path specified in the numerical control code, unintended thread-like or other foreign artifacts and/or any other disruption in the printed layer) in the extruded layer.

In some embodiments, image analyzer 180 can extract and plot a print path for the printed layer from the setpoints and instructions contained in the generated numerical control code. The image analyzer can convert the plotted print path to pixels, and overlay the pixels on a print path obtained from the generated images for the printed layer, and determine difference between the pixels and the print path. In some embodiments, image analyzer 180 can convert the print path obtained from the generated images for the printed layer into print points in a coordinate system and compare these print points to print points along the plotted path extracted from the generated numerical control code.

If the print path for the printed layer as obtained from the generated images is the same as the extracted print path from the generated numerical control code, the difference between them will be zero or close to zero. A number greater than zero describes the amount of error detected between the actual print path and the print path specified in the generated numerical control code. A comparison of the print paths can also indicate where errors occurred along the print path.

At 680, image analyzer 180 can analyze the number of anomalies and the pattern of the anomalies (including the deviations between the actual path and the print path in the generated numerical control code) that the image analyzer detected from the printed layer and/or prior layers. Based on AIPC from other printed jobs, image analyzer 180 can determine whether any adjustments should be made to the print parameters of the next or subsequent layers of the partially printed object to achieve the desired mechanical, optical and/or electrical properties in view of the detected anomalies. For example, if, based on the detected anomalies, image analyzer 180 determines for a current and/or prior layers of a partially printed object that the mechanical properties for the completed printed object would be weaker than desired, then image analyzer 180 can instruct numerical control code generator 110 and/or control module 160 to adjust certain print parameters (e.g., increase infill density and/or change the infill pattern) on the next or any subsequent layers so that the desired mechanical properties can be achieved.

In some embodiments, operations 610-680 are repeated for each layer, or for any number of layers, that are deposited for a printed object. Image analyzer 180 can use the data obtained at each layer, as well as AIPC from other print jobs to modify the print parameters for the next and/or subsequent layers to achieve the desired mechanical, optical and/or electrical properties and/or the desired design of the printed object. In further embodiments, the mechanical, optical and/or electrical properties of the completed printed object can be measured.

The division of when the particular portions of process 600 are performed can vary, and no division or a different division is within the scope of the subject matter disclosed herein. Note that, in some embodiments, blocks of process 600 can be performed at any suitable times. It should be understood that at least some of the portions of process 600 described herein can be performed in any order or sequence not limited to the order and sequence shown in and described in connection FIG. 6 in some embodiments. Also, some portions of process 600 described herein can be performed substantially simultaneously where appropriate or in parallel in some embodiments. Additionally or alternatively, some portions of process 600 can be omitted in some embodiments.

Process 600 can be implemented in any suitable hardware and/or software. For example, in some embodiments, process 600 can be implemented in image analyzer 180 or numerical control code generator 110.

In some embodiments, image analyzer 180 can learn anomaly patterns for each layer of a printed object in order to enable image analyzer 180 to adaptively adjust print parameters at the layer level during the printing process (e.g., as described in connection with FIG. 6) for similar or different objects to achieve desired mechanical, optical and/or electrical properties.

Certain print parameters impact the mechanical, optical and/or electrical properties of a printed object. For example, infill density and infill patterns can impact mechanical properties like maximum tensile strength ($R_m$), yield strength ($Rp_{2\%}$), elongation at break ($A_{\%}$), Young's modulus (E), fatigue ($\sigma_d$), Poisson's ratio, mass and specific gravity.

To understand how anomaly patterns and certain print parameters actually impact the mechanical, optical and/or electrical properties of a printed object, an object can be printed numerous times, while varying the print parameters which have an impact on the mechanical, optical and/or electrical properties of a printed object. The anomaly pattern for each printed object can be determined and recorded at the layer level as described, for example, in connection with FIG. 6 (e.g., at 670). In addition, the mechanical, optical and/or electrical properties of each printed object can be measured and recorded.

Figure 8:
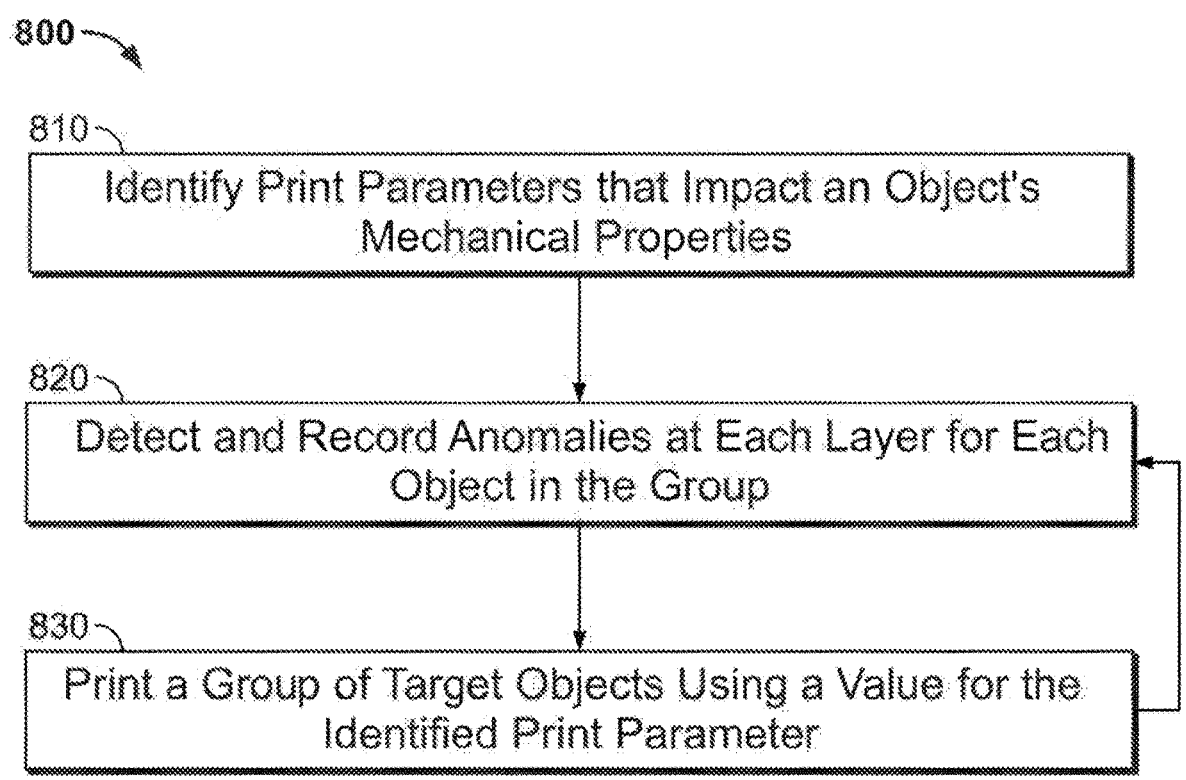
FIG. 8 is an example of a training process for learning anomaly patterns and anomaly rates based on different infill density and infill patterns and how those anomaly patterns and anomaly rates affect the printed object's mechanical properties in accordance with some embodiments.

FIG. 8 shows, an example 800 of a training process for learning anomaly patterns and anomaly rates based on different infill density and infill patterns and how those anomaly patterns and anomaly rates affect the printed object's mechanical properties, in accordance with some embodiments. During the training process, training data used to generate machine learning models may be derived from actual data or simulated data, in combination or separately. Actual training data can be data collected during the operation of equipment in production or otherwise, such as the images taken in real-time during a 3D printing process. Simulated data can be data obtained from computerized methods or simulations that represent production data, such as a sequence of randomly generated images, based on an existing library, that is meant to imitate the real-time capturing of images during a 3D printing process.

At 810, one or more print parameters can be identified that impact an object's mechanical properties. For example, infill density and infill pattern can be identified as impacting an object's mechanical properties. In some embodiments, artificial intelligence algorithms can be used to identify other print parameters that impact an object's mechanical properties.

At 820, a predetermined number ("a group") of a target object can be printed and one or more print parameters that have been identified to impact the target object's mechanical properties can be kept the same for the entire group. For example, each object in the group, can be printed specifying the same infill pattern and infill density print parameters.

At 830, anomalies can be detected and recorded at a layer level for each printed object in the group, as described in connection with 670 of FIG. 6. For example, differences between an actual print path and a print path extracted from the generated control code can be determined for each layer. After each target object in the group is printed, the mechanical properties for that target object can be measured and recorded.

After 830, process 800 can loop back to 820 and, another predetermined number of the target object can be printed at different infill density and/or infill pattern.

820 and 830 can be repeated as many times as necessary to train image analyzer 180 to learn how anomaly patterns and different identified print parameters (e.g., infill density and infill pattern) affect the mechanical properties of an object. Each time a predetermined number of the target object is printed ("a group") the identified parameter (e.g., infill density and/or infill pattern) can be changed. The table below reflects example groups for a target object and their specified infill density and infill pattern print parameters:

| Target Object | Infill Density | Infill Pattern |
|---|---|---|
| Group 1 | 100% | Solid |
| Group 2 | 85% | Honeycomb |
| Group 3 | 85% | Triangular |
| Group 4 | 50% | Honeycomb |
| Group 5 | 50% | Triangular |
| Group 6 | 20% | Honeycomb |
| Group 7 | 20% | Triangular |

In some embodiments, the infill density and infill pattern print parameters are held constant for each layer of a printed object. In other embodiments, the infill density and/or infill pattern is varied for different layers of an object depending where the layer is located or at random.

Once image analyzer 180 has learned how different anomaly rates and patterns and the identified print parameters (e.g., different infill density and infill patterns) affect the mechanical properties of an object, the image analyzer can adaptively adjust the values for the identified print parameters during a print job (e.g., at a layer level) to achieve desired mechanical properties. For example, image analyzer 180 can detect that printed layers of a partially printed object have a certain anomaly rate and pattern that would likely result in sub-par mechanical properties for the printed object once completed if the infill density and infill pattern were not adjusted. Image analyzer 180 can then adjust the infill rate and infill pattern print parameters for the next and/or any subsequent layers to achieve the desired mechanical properties, while also trying to reduce the occurrence of anomalies.

A similar process can be performed for learning how anomaly patterns affect optical and/or electrical properties of an object. For example, print parameters that impact the optical and/or electrical properties of an object can be identified. Groups of a target object can be printed, controlling the identified print parameters across the groups of a target object as described above. Once image analyzer 180 has learned how different anomaly rates and patterns and the identified print parameters affect the electrical and/or optical properties of an object, the image analyzer can adaptively adjust values for the identified print parameters during a print job, at a layer level, to achieve desired electrical and/or optical properties.

A similar process can be performed for learning how non-controllable variables (i.e., variable that are non-controllable without human intervention) affect mechanical, optical and/or electrical properties of an object. For example, non-controllable variables that impact the mechanical, optical and/or electrical properties of an object can be identified. Groups of a target object can be printed, controlling the identified non-controllable variable across the groups of a target object as described above. Once image analyzer 180 has learned how different anomaly rates and patterns and the identified print non-controllable variables affect the mechanical, electrical and/or optical properties of an object, the image analyzer can adaptively adjust values for print parameters during a print job, at a layer level, to compensate for the non-controllable variables and to achieve desired electrical and/or optical properties.

The division of when the particular portions of process 800 are performed can vary, and no division or a different division is within the scope of the subject matter disclosed herein. Note that, in some embodiments, blocks of process 800 can be performed at any suitable times. It should be understood that at least some of the portions of process 800 described herein can be performed in any order or sequence not limited to the order and sequence shown in and described in connection FIG. 8 in some embodiments. Also, some portions of process 800 described herein can be performed substantially simultaneously where appropriate or in parallel in some embodiments. Additionally or alternatively, some portions of process 800 can be omitted in some embodiments.

Process 800 can be implemented in any suitable hardware and/or software. For example, in some embodiments, process 800 can be implemented in image analyzer 180 or numerical control code generator 110.

In some embodiments, image analyzer 180 can use generated topographical images, and/or other generated images for the printed layer (as described in 660 of FIG. 6), as well as the generated numerical control code for the printed layer, to learn the relationship between the print parameters and the resulting print head motion, as well as the anomalies (e.g., unintended gaps or curled edges, warped or uneven patterns, points of excessive extrusion, curled edges, deviations from the print path specified in the numerical control code, unintended thread-like or other foreign artifact and/or any other disruption in the printed layer) in the extruded layer. Image analyzer 180 can also invert the learned relationship to calculate the optimal numerical control code input parameters that will result in a desired print head motion and minimize anomalies in the extruded layer. More specifically, input variables to the artificial intelligence algorithms can include: the previous measured position of the printer head (represented by $\hat{x}_{i-1}$); the control code print parameters that resulted in the previous position of the print head (represented by $\theta_{i-1}$); and the current measure position of a printer head (represented by $\hat{x}_i$). And the output variable can be the numerical control code parameters that resulted in the current position of the printer head (represented by $\theta$). Together the input variables and the output variable can serve as a single training sample for the artificial intelligence algorithms. A single printed layer can result in hundreds of such training samples. These training samples, along with knowledge of anomalies in prior layers, the desired specifications of the production design, the print features of the additive manufacturing printer and/or ambient conditions can be used to calculate the optimal print parameters to generate a desired print head motion. In some embodiments, training samples, along with knowledge of anomalies in prior layers, the desired specifications of the production design, the features of the additive manufacturing printer and/or ambient conditions can be used to calculate the optimal print parameters, as well as the optimum placement of X-Y-Z setpoints and instructions for the print path, in subsequent layers.

In some embodiments, image analyzer 180 can also be applied to learn the relationship between print parameters and overall characteristics of a layer. For example, image analyzer 180 can be applied to learn a total number of anomalies in an extruded layer, how closely motion of the print head and/or build plate resembled print path instructions in generated numerical control code, and specified infill density. In some embodiments, image analyzer 180 can invert learned relationships to calculate print parameters that will result in a layer that most closely resembles specifications of a production design, including desired mechanical, optical and/or electrical properties.

In some embodiments, image analyzer 180 can use generated topographical images, and/or other generated images, for a printed layer, as well as generated numerical control code for the printed layer, to learn a relationship between non-controllable variables (i.e., variable that are non-controllable without human intervention) and the resulting print head motion, as well as the anomalies (e.g., unintended gaps or curled edges, warped or uneven patterns, points of excessive extrusion, deviations from the print path specified in the numerical control code, unintended thread-like or other foreign artifacts and/or any other disruption in the printed layer) in a deposited layer. If image analyzer 180 discovers that non-controllable variables are adversely affecting, beyond a threshold tolerance, a resulting print head motion and/or anomalies in a deposited layer, image analyzer 180 can send an alert to control module 160. Control module 160, upon receipt of an alert, can display a warning on a display of additive manufacturing system 100 and/or alert an operator via email, text or any other suitable electronic mechanism. In some embodiments, image analyzer 180 can be configured to alert an operator directly via email, text or any other suitable electronic mechanism. For example, in some embodiments, if image analyzer 180 determines that ambient humidity, temperature and/or light is negatively impacting a resulting print head motion or the number of anomalies in a layer is beyond a predetermined tolerance, then image analyzer 180 can send an alert to control module 160 and/or an operator. In some embodiments, if image analyzer 180 determines that wear and tear of additive manufacturing printer 115 and/or the total amount of filament available to print head 140 (e.g., low amount of filament) is negatively impacting a resulting print head motion or the number of anomalies in a layer is beyond a predetermined tolerance, then image analyzer 180 can send an alert to control module 160 and/or an operator to replace the additive manufacturing printer and/or to refill the filament. In some embodiments, if image analyzer 180 determines that a voltage variation is negatively impacting a resulting print head motion or the number of anomalies in a layer is beyond a predetermined tolerance, then image analyzer 180 can send an alert to control module 160 and/or an operator to check a voltage source.

The training process may also involve the use of training environments that consist of actual environments or simulated environments, in combination or separately. In some embodiments, an actual training environments can involve real environments that are used to train a model, where the real environment can include physical measurements (e.g., by 3D printing an object and measuring a physical weight of the object, surface morphology, mechanical properties and/or any other suitable physical measurements(s)). In some embodiments, simulated environments can include training environments that are simulated using numerical or computerized methods, such as calculating the weight of a 3D printed structure using a theoretical density and volume.

The training process may also involve the use of training environments that consist of actual environments or simulated environments, in combination or separately. In some embodiments, an actual training environments can involve real environments that are used to train a model, where the real environment can include physical measurements (e.g., by 3D printing an object and measuring a physical weight of the object, and/or any other suitable physical measurements(s)). In some embodiments, simulated environments can include training environments that are simulated using numerical or computerized methods, such as calculating the weight of a 3D printed structure using a theoretical density and volume.

In some embodiments, a simulated training environment may be used to initialize a machine learning model before training in an actual environment to help reduce the time and resources needed to train in a real-life environment. For example, in some embodiments, a machine learning model may be built to increase the precision of tensile strength of 3D printed structures. The model can be initialized using simulations, thereby allowing training of the model to begin with simulated training data prior to generation of actual training datasets in an actual 3D printing environment. A simulated environment may mimic tensile pull tests of the 3D printed structures by using finite element analysis (FEA) to compute the tensile strength of the 3D printed structures.

In some embodiments, the machine learning framework of a simulated environment may involve any suitable reinforcement learning (RL) techniques or algorithms. Reinforcement learning refers to computer algorithms, or agents, that use a set of rules and inputs to take action in an environment and its various conditions, or states. Based on the corresponding results of those actions, the agents adjust their following actions in order to maximize the accumulation of positive results, or rewards. Some embodiments may use frameworks with asynchronous, distributed reinforcement learning, which refers to multiple agents interacting in parallel with the environment and storing their sequences of actions, or trajectories, in a global memory, such as shown in and described below in more detail in connection with FIG. 12. Note that, additional techniques for using reinforcement learning to training an agent (e.g., a process implementing a printing operation) to take an action (e.g., modify a printing parameter) to correct an error are shown in and described below in connection with FIGS. 10 and 11. The frameworks may also use Deep Q-learning (DQN) and experience replay to prioritize the input data to provide to RL agents such as input that has not been seen before or is of relatively high importance, such as described below in more detail in connection with FIG. 12. These embodiments that utilize asynchronous, distributed reinforcement learning, DQN, and experience replay may converge faster and produce solutions that are more robust when given new input data.

Figure 10:
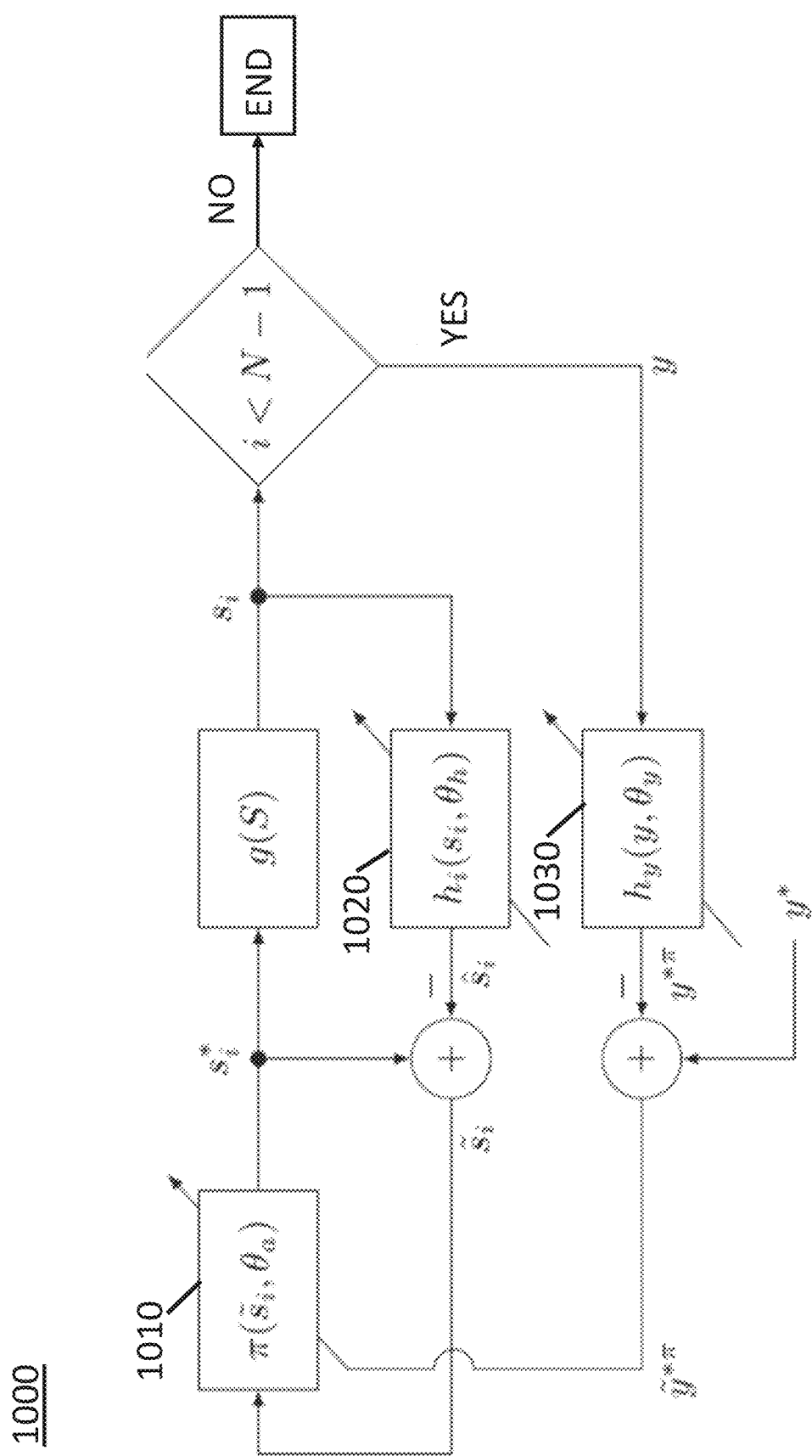
FIG. 10 shows an example schematic diagram for using reinforcement learning to modify printing parameters during printing of a printed object in accordance with some embodiments of the subject matter.

Turning to FIG. 10, an example 1000 of a schematic diagram of a generalized paradigm for using reinforcement learning to train manufacturing process is shown in accordance with some embodiments of the disclosed subject matter.

As shown in FIG. 10, the paradigm illustrated in FIG. 10 includes a policy function block 1010 ($\pi(\tilde{s}_i, \theta_a)$), a measurement of nodal states block 1020 ($h_i(s_i, \theta_h)$), and a measurement of the final output block 1030 ($h_y(y, \theta_y)$). Note that, in some embodiments, each of $\theta_a$, $\theta_h$, and $\theta_y$ can be block parameters which can represent a transformation of signals through control loops. In some such embodiments, each block parameter can be linear or non-linear and/or inferred or known. Additional details describing values and parameters for each block are described below.

In some embodiments, i can represent a node, where i is a value from 0 to N−1. Note that, in some embodiments, in an instance in which schematic diagram 1000 is implemented as part of a 3D printing process, N can represent a total number of layers in a printed object.

In some embodiments, a production plant that implements the manufacturing process corresponding to schematic diagram 1000 can generate a scalar output, y, that can be measured, such that y=g(S), where S is a set of states such that $S=[s_0, \ldots s_{N-1}]$. In some embodiments, for a given set of state measurements, output quality can be predicted, allowing a function to be mapped from states to output: f: S→y. In some embodiments, the function f can take a variety of forms depending on a complexity of the system. In some embodiments, the mapping can be achieved through a general-purpose function approximator, such as a regression model, an artificial neural network, and/or any other suitable type of function approximator. In some embodiments, for a set of k training examples where $$\hat{Y}_k = [f(S_0, \theta_Y) \ldots f(S_{k-1}, \theta_Y)]^T$$

and where $$\overline{Y_k} = [\overline{g(S_0)} \ldots \overline{g(S_{k-1})}]^T,$$

a loss function can be defined as $L(\tilde{Y}_k, \theta_Y)$ for $\tilde{Y}_k = Y_k - \hat{Y}_k$. In some embodiments, the loss function can define a basis of a model optimization over the parameter set $\theta_y$, $$\min_{\theta_Y}[L(\tilde{Y}_k, \theta_Y)],$$

such that the output of the function approximator accurately predicts the output of the system process.

In some embodiments, a process to be learned is a Markov Decision Process (MDP), in which future states are conditional on the present state, $s_i$. In some embodiments, a fabrication process can be a partially-observable MDP with uncontrollable system dynamics, such that the conventionally observable Si does not fully encode the information necessary to maximize a predicted reward of a subsequent state via an action. In some such embodiments, a vector of these states $S=[s_0 \ldots s_i]^T$ can describe a sequence of the MDP. In some embodiments, for a given process, there is an ideal set of actions leading to a set of canonical states S*=[s0* ... sN*] that produces an ideal, canonical output, y*=g(S*). In some embodiments, a magnitude of measured state error can be computed as $\tilde{s}_i = s_i^* - s_i$. In some embodiments, the state Si can be estimated using any suitable technique or combination of techniques, such as using Bayesian or Kalman filters, a complex classification using a CNN, and/or in any other suitable manner.

In some embodiments, during initial system identification of g(S), a consideration of a financial cost of controlling each node can be made, as well as a formulation of an expectation distribution. In some embodiments, the expectation distribution can be $\mathbb{E}[s_{i+1}] = \int_{-\infty}^{\infty} \mathbb{E}[s_{i+1}|s_i] p(s_i) ds_i$. Note that, in some embodiments, some nodes i can be more costly to constrain, and, as such, corrections to $$S_{\tau_i} = [s_{i+1} \ldots \overline{s_{i+\tau_i}}]^T \text{ for } \tau_i \in [1, N-i-1]$$

can be more cost effective when an error is greater than a predetermined threshold derived from $\mathbb{E}[s_{i+1}]$ such that $\|s_i^* - s_i\| > \gamma_i$, where $\gamma_i$ indicates the acceptable tolerance. In some embodiments, by constraining the nodal states $S_T$, there can be an advantaged obtained with respect to overall output quality $\tilde{y}_k^* = \tilde{y}^* - \tilde{y}_k$, where the optimization of the process $$\min_{S_T} \tilde{y}_k^*$$

does not necessarily yield $S_{\tau_i} = S_{\tau_i}^*$.

Note that, in the most generalized implementation, $\gamma_i = 0$, $\tau_i = N-i-1$ for all nodes i from 0 to N−1, and $s_{i+1}^* \leftarrow T(a_i)$, where T(.) is the result of some action, $a_i$, chosen by a policy $\pi$. That is, in some embodiments, any deviation in a measured state $s_i$ from the canonical $s_i^*$ can result in an adjustment to all subsequent definitions of a canonical state. In some embodiments, using a policy $\pi$ to select an optimal action $a_i$ is consistent with general reinforcement paradigms. In some embodiments, the convergence of the policy to an optimal policy $\pi \to \pi^*$ can be dependent on degrees of freedom relative to $\tau_i$ and based on a discretization of the actions $a_i$ into $a_{i,k} \in [a_{i,0} \ldots a_{i,M-1}]$ for M possible action values.

In some embodiments, the policy can be learned using any suitable technique or combination of technique(s). For example, in some embodiments, the policy can be learned using a value-iteration method, such as Q-learning. As another example, in some embodiments, the policy can be learned using a policy-iteration model, such as an Actor-Critic method.

In some embodiments, a policy can be defined by $s_{i+1}^{*\pi} = T(\pi(\tilde{s}_i, \theta_a))$, where $\theta_a$ corresponds to parameters associated with the choice of action. In some embodiments, the canonical state vector can be written as a function of the policy, such that $$S^{*\pi} = [s_0^* \ldots s_{N-1}^{*\pi}]^T,$$

and the output of the process can be defined by $\tilde{y}^{*\pi} = g(S^{*\pi})$.

In some embodiments, the error in the process can be defined as $\tilde{y}^{*\pi} = \tilde{y}^* - \tilde{y}^{*\pi}$.

In some embodiments, the optimization of the policy can be defined by $$\min_{\theta_a}[\tilde{y}^{*\pi}(S^{*\pi}, \theta_a)]$$

such that as $\tilde{y}^{*\pi} \to 0$ and as $\pi \to \pi^*$ with appropriate persistent excitation of $\tilde{y}^{*\pi}$.

Note that, in schematic diagram 1000, the parameters $\theta_Y$ and $\theta_a$ that define the process function approximator and corrective policy, respectively, are useful for inference. In particular, learning $\theta_Y$ allows for virtual replication of the process and a more rigorous tuning of the learning applied to $\theta_a$, which are the fundamental model parameters to correct for variation in costly process nodes.

Figure 11A:
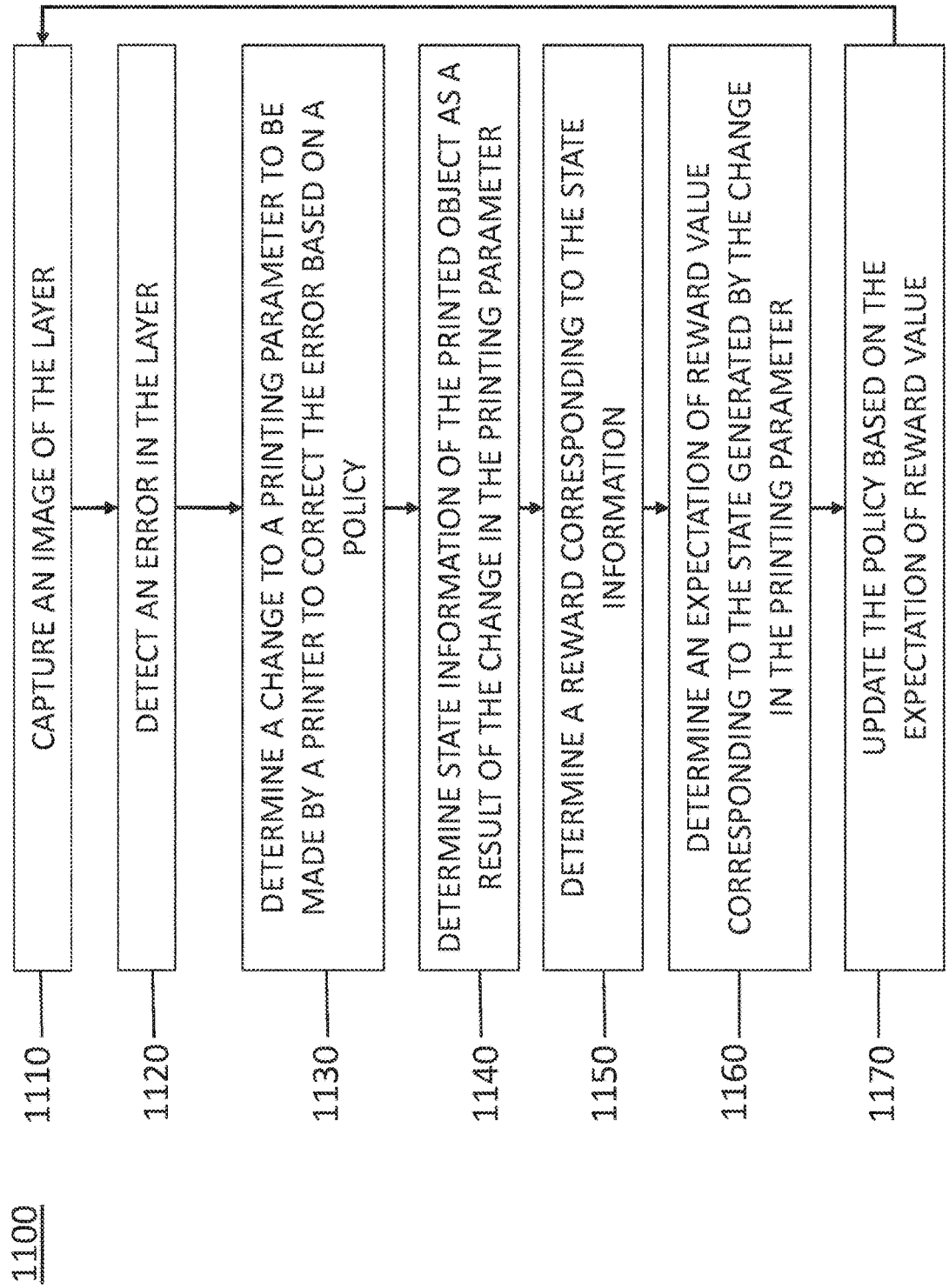
FIG. 11A shows an example of a process for training a reinforcement learning algorithm for modifying printing parameters during printing of a printed object in accordance with some embodiments of the subject matter.

Turning to FIG. 11A, an example 1100 of a process for training a reinforcement learning algorithm for a printing operation to perform a corrective action that can be implemented in connection with a 3D printer is shown in accordance with some embodiments of the disclosed subject matter. Note that, in some embodiments, process 1100 can be a process that implements the techniques shown in the generalized schematic shown in, and described above in connection with, FIG. 10.

In some embodiments, each node (corresponding to one acquired image) can correspond to a layer of a printed object. In some embodiments, parameters of a layer can correspond to actuation points for a policy, as well as measurements for states. In some embodiments, the parameters can include extruder nozzle temperature, a volume of extruded plastic, motion dynamics of a print head, ambient environment conditions, material properties of the extruded thermoplastic, extruder velocity, and/or any other suitable parameters.

Note that, although process 1100 is generally described as training a reinforcement algorithm to determine a corrective action to correct a tensile strength during printing of an object, in some embodiments, the techniques described in connection with process 1100 can be implemented to determine a corrective action in connection with any suitable measurement or metric.

Process 1100 can begin at 1110 by capturing an image of the layer. Note that, in some embodiments, the image can have any suitable size and/or resolution At 1120, process 1100 can detect an error in a printed object at a particular layer of the object based on the image captured at 1110. Note that, in some embodiments, images of layers of the printed object can correspond to training iterations used during training of the reinforcement learning algorithm.

Figure 11B:
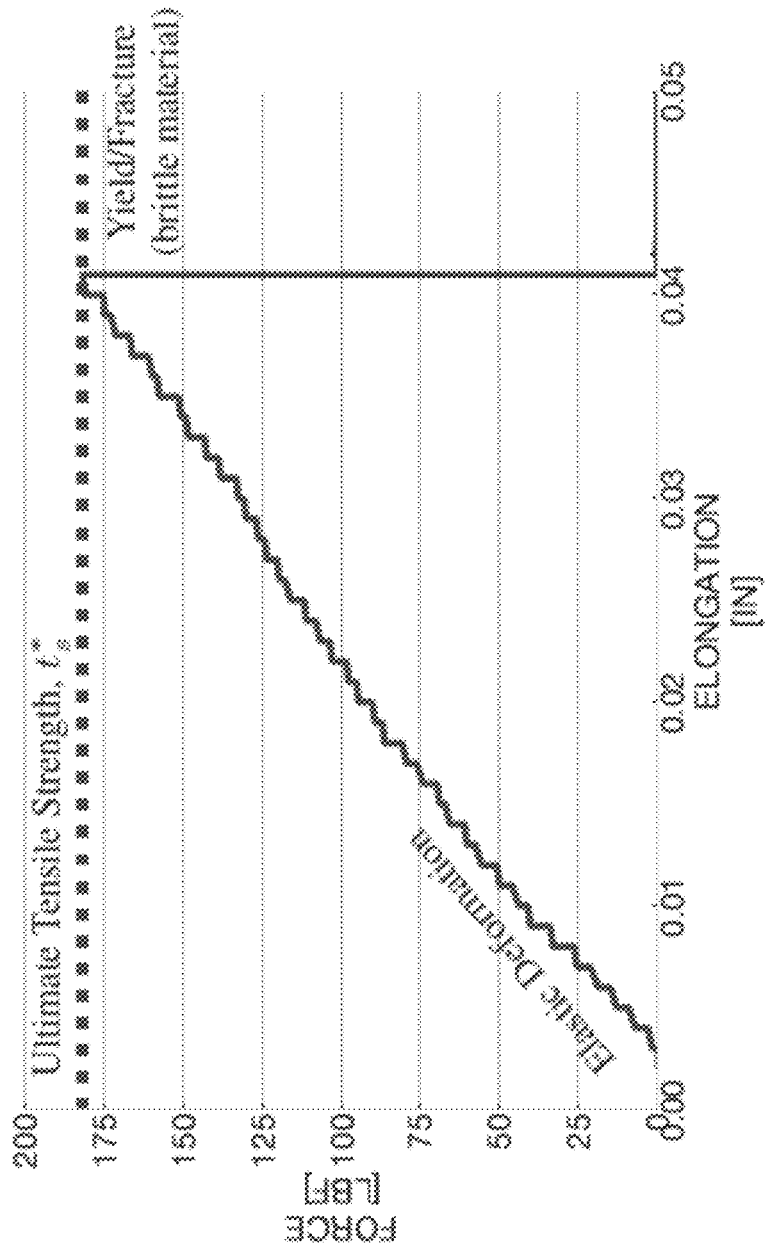
FIGS. 11B and 11C show examples of a canonical tensile curve and an uncorrected tensile curve in accordance with some embodiments of the disclosed subject matter.
Figure 11C:
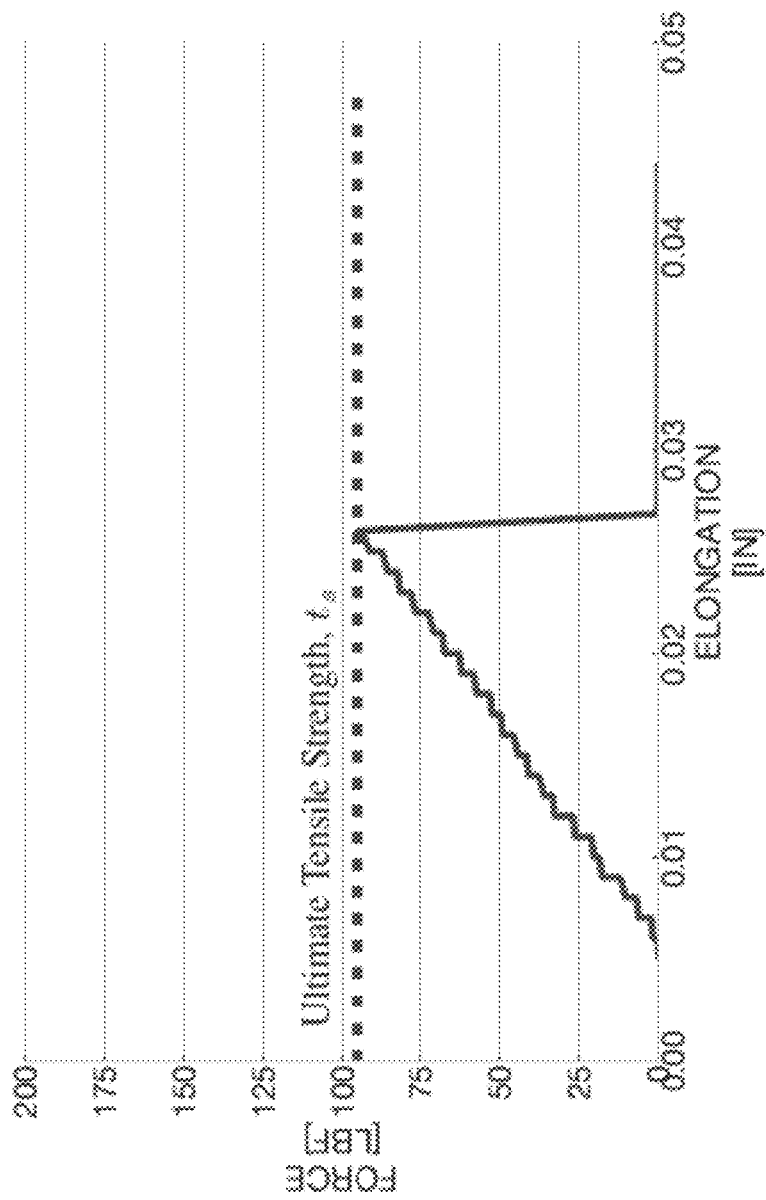

Note that, in some embodiments, process 1100 can additionally access a median canonical test curve that indicates tensile strength as a function of elongation, as shown in FIG. 11B. In some embodiments, the printed object with the error can be associated with an uncorrected median tensile curve, as shown in FIG. 11C. Note that, in FIG. 11C, an error is present at layer i=30. Additionally, note that, in some embodiments, process 1100 can be trained to determine a corrective action that returns the uncorrected tensile curve shown in FIG. 11C to the canonical tensile curve shown in FIG. 11B.

At 1130, process 1100 can determine a change to a printing parameter to be made by a printer to correct the error based on a policy. Note that, in some embodiments, the change to the printing parameter can correspond to an action to be taken by the reinforcement learning algorithm. Additionally, note that, in some embodiments, the policy can be initialized in any suitable manner.

In some embodiments, a change to a printing parameter can correspond to any suitable change, such as determining an extrusion multiplier to change a volume of extruded plastic. Note that, in some embodiments, a sequence of changes can be determined, where the sequence includes any suitable number of changes or actions (e.g., one, two, three, and/or any other suitable number). For example, in some embodiments, process 1100 can determine a sequence of three extrusion multipliers to be provided, indicated as $a_1$, $a_2$, and $a_3$. Note that the action space can be defined in any suitable manner, such as $a_i \in [1.0, 1.1, \ldots 3.0]^T$, and/or in any other suitable manner.

At 1140, process 1100 can determine state information.

Note that, in some embodiments, a state can be prepended with a last action, thereby providing an implicit memory for the policy to act on, while also providing nodal values, which allow for inference of nodal dependencies. In some embodiments, in the applied case of 3D printing, these dependencies can materialize as varying layer geometries on which actions can be taken without explicitly encoding these geometries into the state information. In some embodiments, the state/action formulation shown above can result in a tightening of a Markov assumption such that each state contains all necessary in correcting the tensile strength deviation.

In some embodiments, process 1100 can calculate a tensile strength corresponding to the state information. For example, continuing with the example state/action information given above, process 1100 can calculate a tensile strength, referred to herein as $\hat{t}_s$. In some embodiments, a tensile strength error can be calculated based on the canonical tensile strength. In some embodiments, the tensile strength error is referred to herein as $\tilde{t}_s^{*\pi}$ At 1150, process 1100 can calculate a reward corresponding to the state information. In some embodiments, the reward can be calculated using a reward function such as:

$$R(S, \theta_a) = \alpha T_s - \beta \sum_{i=0}^{N_a} a_i,$$

where the reward is weighted by coefficients $\alpha$ and $\beta$.

In some embodiments, in an instance in which the measurement to be corrected in tensile strength, a tensile strength reward $T_s$ can be calculated, where $T_s$ is defined as:

$$T_s = \begin{cases} T_{s,max} & \text{if } |\tilde{t}_s|^{-1} > T_{s,max} \\ |\tilde{t}_s|^{-1} & \text{else} \end{cases}.$$

In some embodiments, this definition can represent a saturation at some value $T_{s,max}$, which can allow for a scaled absolute value, hyperbolic reward curve, without unstable results near the canonical tensile strength.

At 1160, process 1100 can calculate an expectation of reward value corresponding to the state generated by the change(s) in the printing parameter. Note that the expectation of reward given a state/action pair is generally referred to herein as a Q-value, and can be defined as $$Q(s_i, a_i, \theta_a) = \mathbb{E}[R(S, \theta_a) | s_i, s_{i+1}(a_i)]$$

Additionally, note that, given that the system has a delayed reward, individual rewards per node i can be propagated in any suitable manner (e.g., using the Bellman equation) such that any action $a_i$ has an associated reward $r_i$ defined by:

$$r_i = \begin{cases} R(S, \theta_a) & \text{if } i = N_a \\ R(S, \theta_a) + \gamma \max_\pi(\hat{Q}(s_{i+1}, a_i, \hat{\theta})) & \text{else} \end{cases}$$

with a discount factor of $0<\gamma<1$.

In some embodiments, the Q-value function can be optimized in any suitable manner, such as by using a Deep Q-Learning approach, an asynchronous method and an actor-critic paradigm for policy updates (e.g., as described in Mnih et al., "Asynchronous methods for deep reinforcement learning," International conference on machine learning, 2016, pp. 1928-1937, which is hereby incorporated by reference in its entirety), a model simplification to cerebellar model arithmetic computer (CMAC) topology (e.g., as described in Albus, "A new approach to manipulator control: The cerebellar model articulation controller (cmac)," Journal of Dynamic Systems, Measurement, and Control, vol. 97(3), pp. 220-227, which is hereby incorporated by reference herein in its entirety), and/or in any other suitable manner.

At 1170, process 1100 can update the policy based on the expectation of reward value. For example, the policy $\pi(\tilde{s}_i, \theta_a)$ can be defined by $$\pi(s_i, \theta_a) = \underset{a_i}{\mathrm{argmax}} \hat{Q}(s_i, a_i, \theta_a).$$

In some embodiments, the policy can be updated using the Q-value.

Process 1100 can then loop back to 1110 to continue training the reinforcement learning algorithm.

Note that, in some embodiments, after the reinforcement learning algorithm has been trained, parameters of the trained model (e.g., the Q-value function, and/or any other suitable parameters) can be used by any suitable printing process to perform corrective actions during printing of an object. For example, in some embodiments, a current state associated with a current layer of an object being printed can be identified (e.g., by capturing an image of the layer), and a series of corrective actions can be identified by the printing process using the Q-value function. In some embodiments, further corrective actions can be identified at subsequent layers of the printed object. Note that, in some embodiments, use of the reinforcement learning algorithm can be combined with any other suitable classifiers, such as the failure classifier and/or the extrusion classifier described above in connection with FIG. 9, to allow the printing process to determine if printing of the object is to be terminated and/or to calculate a quality score associated with a particular layer.

Note that, in some embodiments, to configure a reinforcement learning algorithm to a 3D printing environment, a finite element model can be built to represent a printed part in tension, where a stiffness matrix is a function of the plastic extruded on a layer with defined geometry. In some embodiments, this simulation can act as a virtual environment to tune hyper-parameters that control the optimization of model parameters $\theta_a$ prior to hardware implementation.

Additionally, note that, in some embodiments, the reinforcement learning algorithm described in connection with FIG. 11 can be combined with any other suitable algorithm(s) that can infer any other suitable information, such as that a printed object has toppled over, a printing error (e.g., as shown in and described above in connection with FIG. 9), etc. Furthermore, in some embodiments, an agent executing the reinforcement learning algorithm can assess an optimal path for inspection, by minimizing the energy and time of the inspection process.

A particular example for performing an action and determining a resulting state and reward is described hereinbelow. In the particular example, a group of 3D printers (e.g., three, four, five, six, and/or any other suitable number) can be initialized as a group of workers and can be used for parallel data collection for training of a reinforcement learning model, as shown in and described below in connection with FIG. 12. Additionally, in the particular example, each 3D printer can print a 3D object with a particular number of layers (e.g., five hundred, one thousand, and/or any other suitable number) and can take corrective actions that each vary a print condition such that a tensile strength of the object at a particular layer is maintained at a canonical, or expected, tensile strength. Note that additional details describing tensile strength and canonical tensile strength are shown in and described above in connection with FIGS. 11B and 11C.

Figure 12:
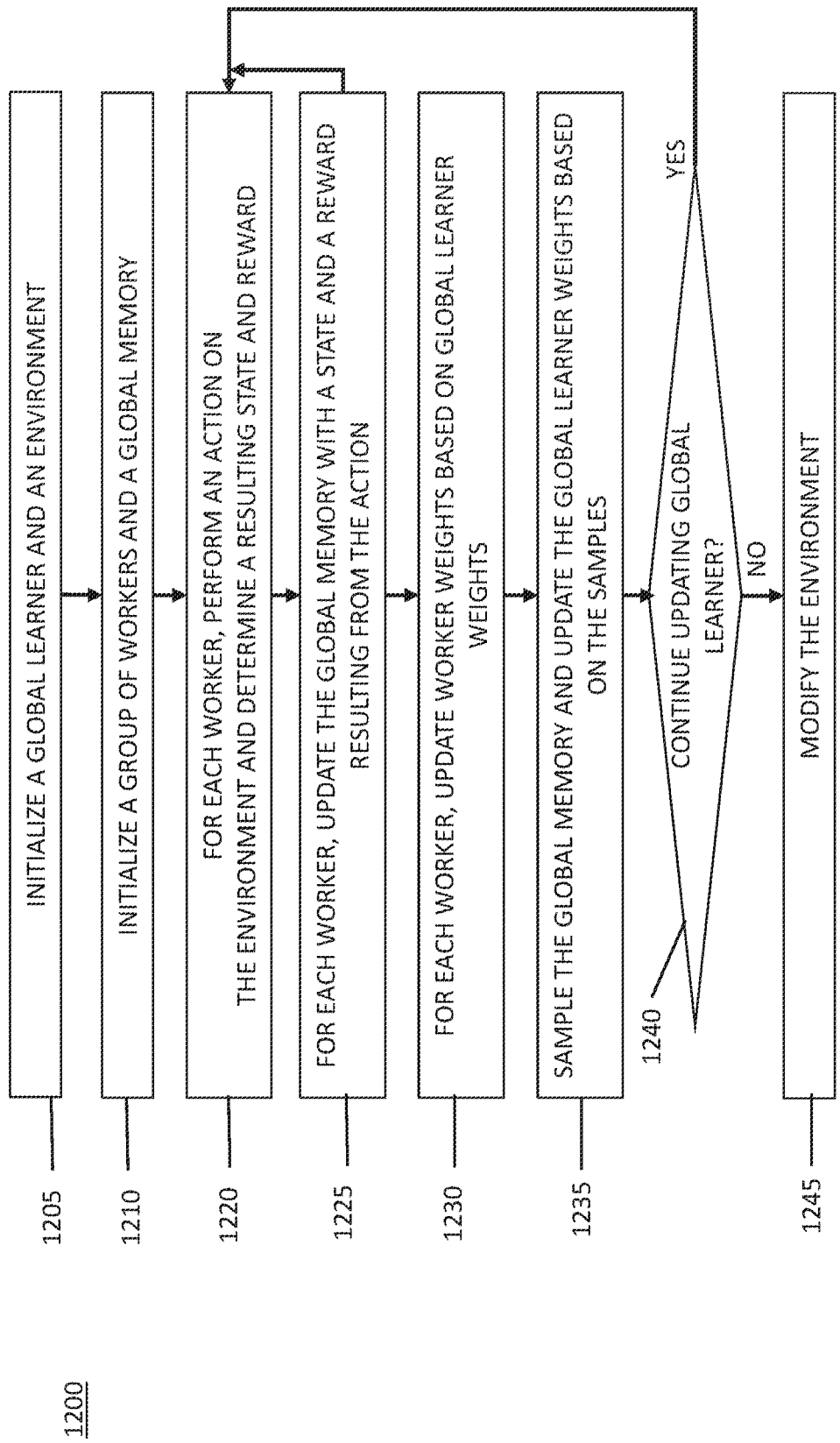
FIG. 12 shows an example of a process for training a reinforcement learning algorithm for modifying printing parameters during printing of a printed object using a group of 3D printers (also referred to as workers) in accordance with some embodiments of the subject matter.

Turning to FIG. 12, an example 1200 of a process for training a reinforcement learning model using a group of 3D printers is shown in accordance with some embodiments of the disclosed subject matter. Note that each 3D printer in the group of 3D printers is referred to herein as a worker. In some embodiments, process 1200 can use a group of individual workers that are each an agent executing a reinforcement learning algorithm (e.g., as described above in connection with FIGS. 10 and 11). In some embodiments, each of the workers can interact with a global learner that updates weights, such that each of the workers can learn from the global learner, and, implicitly, from the other workers in the group. Note that, in some embodiments, the group of workers can include any suitable number of workers (e.g., two, three, five, ten, and/or any other suitable number), and each worker in the group of workers can correspond to a different 3D printer.

Process 1200 can begin at 1205 by initializing a global learner and can initialize an environment.

In some embodiments, the global learner can be initialized with weights using any suitable initialized technique(s), such as Xavier initialization. Note that, in some embodiments, the weights associated with the global learner can correspond to weights that are learned during training of the global learner and the individual workers in the group of workers, for example, using Deep Q learning, and/or in any other suitable manner.

In some embodiments, the environment can correspond to any suitable parameters associated with a printed object, such as any suitable printing parameters. In some embodiments, the environment can be initialized in any suitable manner. For example, in some embodiments, the environment can be initialized using any suitable initial parameters for a printed object.

At 1210, process 1200 can initialize a group of workers and a global memory. In some embodiments, process 1200 can initialize each worker in the group of workers by setting weights associated with each worker, referred to herein as $\theta$, to the weights associated with the global learner, referred to herein as $\theta^+$. Additionally, in some embodiments, process 1200 can set gradients of weights associated with the global learner, referred to herein as $\Delta\theta^+$ to 0. In some embodiments, process 1200 can initialize the global memory in any suitable manner, for example, by allocating a memory of any suitable size.

At 1220, process 1200 can perform, for each worker, at a current time t, an action on the environment. In some embodiments, process 1200 can perform the action on the environment in any suitable manner. For example, in some embodiments, process 1200 can retrieve a current state of the environment at the time t, referred to herein as $s_t$. In some embodiments, process 1200 can then identify an action to be taken at time t, referred to herein as $a_t$. In some embodiments, process 1200 can identify the action $a_t$ in any suitable manner. For example, in some embodiments, process 1200 can determine that a random action selected from the group of potential actions is to be selected with a probability $\in$, or, alternatively, that an action is to be selected according to $a_t$=argmax(Q($s_t$, a; θ)), where Q is the Q-value function corresponding to an expectation of reward. Note that, in some embodiments, Q can be optimized using any suitable reinforcement learning technique(s).

In some embodiments, after selecting the action $a_t$, process 1200 can execute an on the environment E, and can identify a reward $r_t$ and a next state $s_{t+1}$ that follow from executing $a_t$ on environment E. Note that, in some embodiments the reward and the next state can be based on any suitable information associated with the environment, such as a volume of extrusion, an extrusion quality score (e.g., as described above in connection with FIG. 9), whether an error or failure has been detected (e.g., as described above in connection with FIG. 9), a measurement (e.g., a weight of a portion of an object, a density of a portion of an object, and/or any other suitable simulated measurement) and/or any other suitable information.

A particular example for performing an action and determining a resulting state and reward is described hereinbelow. In the particular example, a group of 3D printers (e.g., three, four, five, six, and/or any other suitable number) can be initialized as a group of workers and can be used for parallel data collection for training of a reinforcement learning model. Additionally, in the particular example, each 3D printer can print a 3D object with a particular number of layers (e.g., five hundred, one thousand, and/or any other suitable number) and can take corrective actions that can vary a print condition such that a tensile strength of the object at a particular layer is maintained at a canonical, or expected, tensile strength. Note that additional details describing tensile strength and canonical tensile strength are shown in and described above in connection with FIGS. 11B and 11C.

In the particular example, a 3D printer of the group of 3D printers can identify a state st that is a function of parameters of each layer with an encoded history of a trajectory that indicates previous actions and states. The 3D printer can then select an action $a_t$, which can be a correction multiplier to an actuation of printing parameters for printing of a subsequent layer. A reward $r_t$ can then be calculated, where $r_t$ is a function of the observed response to $a_t$. In some embodiments, $r_t$ can be calculated using $r_t=1/(f(s_{t+1}))$.

In some embodiments, a result of the action can be determined using a tensile pull test which can indicate tensile strength.

In some embodiments, the reward $r_t$ can be calculated for each action at in any suitable manner. For example, in some embodiments, $r_t$ can be a function of the amount of manufacturing resources (e.g., volume of plastic) that are used. As another example, in some embodiments, a reward $r_t$ for a terminal $s_t$ (e.g., for printing of a final layer of the printed object) can be calculated based on a tensile strength calculated at the final $s_t$.

Referring back to FIG. 12, in some embodiments, process 1200 can also determine whether a done flag is to be set, where the done flag indicates that the worker has finished all training iterations.

At 1225, process 1200 can, for each worker, update the global memory with the state and the reward resulting from the action. In some embodiments, process 1200 can update the global memory in any suitable manner. For example, in some embodiments, process 1200 can cause the tuple ($s_t$, $a_t$, $r_t$, $s_{t+1}$, done) to be appended to the global memory. Note that, in some embodiments, the global memory can be stored in any suitable location, such as a server external to a device executing process 1200, and/or in any other suitable location.

In some embodiments, process 1200 can loop back to 1220 and can perform 1220 and 1225 until the done flag has been set to true.

At 1230, process 1200 can, for each worker, update the worker weights θ based on the global learner weights $θ^+$. In some embodiments, process 1200 can update the worker weights in any suitable manner. For example, in some embodiments, process 1200 can set the weights for each worker to the global learner weights.

At 1235, process 1200 can, for each worker, sample the global memory and can update the global learner weights based on the samples. In some embodiments, process 1200 can retrieve a randomly selected mini-batch of tuples ($s_t$, $a_t$, $r_t$, $s_{t+1}$, done). In some embodiments, the mini-batch can be of any suitable size (e.g., ten tuples, one hundred tuples, five hundred tuples, and/or any other suitable size).

Note that, in some embodiments, process 1200 can sample the global memory by prioritizing tuples that are determined to have relatively greater importance and that occur relatively less frequently. In some such embodiments, each tuple stored in the global memory can also include a priority flag $p_i$ that indicates a priority of the corresponding state transition included in the tuple. In some embodiments, process 1200 can then sample tuples from the global memory according to $$P(i) = \frac{p_i^\alpha}{\sum_k p_k^\alpha},$$

where α is a weight that indicates how frequently tuples with relatively high priority flags are to be selected. For example, in an instance in which α=0, tuples can be selected randomly with uniform distribution, whereas, when α=1, tuples associated with the highest priorities can be preferentially sampled.

In some embodiments, process 1200 can update the global learner weights based on the retrieved tuples in any suitable manner. For example, in some embodiments, for each tuple, process 1200 can determine a target output value $y_t$, where $$y_t = \begin{cases} 0, & \text{if terminal } s_t \\ \max_a Q(s_t, a; \theta^+), & \text{otherwise} \end{cases}.$$

Continuing further with this example, in some embodiments, process 1200 can then modify $y_i$ based on the reward, such that $y_t$ is set to $r_t-\gamma y_t$. Continuing still further with this example, in some embodiments, process 1200 can calculate gradients for the global learner weights, $\Delta\theta^+$, such that $\Delta\theta^+$ is incremented by $$\frac{\partial(y_t - Q(s_i, a_i; \theta))^2}{\partial \theta}.$$

In some embodiments, process 1200 can then update the global learner weights, $\theta^+$, based on the gradients for the global learner weights, $\Delta\theta^+$.

At 1240, process 1200 can determine whether to continue updating the global learner. In some embodiments, process 1200 can determine whether to continue updating the global learner based on whether more than a predetermined number of workers, $T_{MAX}$, in the group of workers have set a corresponding done flag to true. That is, in some embodiments, process 1200 can determine whether to continue updating the global learner based on whether more than a predetermined number of workers in the group of workers have finished a current training epoch. Note that, in some embodiments, the value of $T_{MAX}$ can be chosen based on any suitable information (e.g., based on information associated with the manufacturing environment), such that the global learner can continue to be updated in instances in which one or more workers in the group of workers are delayed in transmitting tuples to the global memory. In some embodiments, $T_{MAX}$ can be any suitable value less than or equal to the number of workers in the group of workers.

If, at 1240, process 1200 determines that process 1200 should continue updating the global learner ("yes" at 1240), process 1200 can loop back to 1220.

If, at 1240, process 1200 determines that the global learner should not be updated, process 1200 can modify the environment at 1245. In some embodiments, process 1200 can modify the environment in any suitable manner. For example, in some embodiments, process 1200 can modify parameters of the environment that correspond to a particular layer of a printed object based on the action taken. As a more particular example, in some embodiments, process 1200 can modify a printing parameter, such as an extrusion velocity, an extrusion volume, a rate of motion of an extruder head, a temperature of an extruder nozzle, and/or any other suitable printing parameter.

In accordance with some embodiments, systems, methods, and media for artificial intelligence process control in additive manufacturing are provided. More particularly, in some embodiments, additive manufacturing systems are provided, the systems comprising: a print head that is configured to print an object in a layer by layer manner; an illumination source for providing illumination to a surface of a printed layer of the object; an image sensor configured to capture an image of the printed layer; and at least one hardware processor configured to: receive a captured image; generate a three-dimensional topographical image of the printed layer; identify an anomaly in the printed layer from the generated topographical image using a first artificial intelligence algorithm; determine a correlation between the identified anomaly and one or more print parameters using a second artificial intelligence algorithm; and assign a value to one or more print parameters.

In some embodiments, methods for additive manufacturing are provided, the methods comprising: receiving a captured image produced by an image sensor configured to capture an image of a printed layer of an object printed in a layer by layer manner; generating a three-dimensional topographical image of the printed layer using a hardware processor; identifying an anomaly in the printed layer from the generated topographical image using a first artificial intelligence algorithm; determining a correlation between the identified anomaly and one or more print parameters using a second artificial intelligence algorithm; and assigning a value to one or more print parameters.

In some embodiments, non-transitory computer-readable media containing computer-executable instructions that, when executed by a processor, cause the processor to perform a method for additive manufacturing are provided, the method comprising: receiving a captured image produced by an image sensor configured to capture an image of a printed layer of an object printed in a layer by layer manner; generating a three-dimensional topographical image of the printed layer; identifying an anomaly in the printed layer from the generated topographical image using a first artificial intelligence algorithm; determining a correlation between the identified anomaly and one or more print parameters using a second artificial intelligence algorithm; and assigning a value to one or more print parameters.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

The additive manufacturing system and method have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure. The scope of the invention is limited only by the claims that follow.

The invention claimed is:

1. A method of training a reinforcement learning model for performing a corrective action in a manufacturing process executing in a manufacturing system, the method comprising:
   receiving, by a computing system, an image of a specimen at a processing node in the manufacturing process;
   detecting, by the computing system, an error in the specimen based on the image of the specimen;

determining, by the computing system using a reinforcement learning model, a change to a manufacturing parameter to correct the error based on a policy;

determining, by the computing system, state information of the specimen, the state information comprising a current action performed on the specimen and a previous action performed by the specimen at an upstream processing node in the manufacturing process;

generating, by the computing system, a quality metric for the specimen based on the state information;

generating, by the computing system, a reward corresponding to the state information;

comparing, by the computing system, an expected reward corresponding to the state information to the generated reward;

determining, by the computing system, that there is a deviation between the reward and the expected reward that exceeds a threshold amount; and based on the determining, updating, by the computing system, the policy implemented by the reinforcement learning model.

2. The method of claim 1, further comprising:
prepending the state information of the specimen with a last action performed on the specimen.

3. The method of claim 1, wherein generating, by the computing system, the quality metric for the specimen based on the state information comprises:
determining a tensile strength of the specimen undergoing manufacturing.

4. The method of claim 3, wherein generating, by the computing system, the reward corresponding to the state information comprises:
optimizing the tensile strength of the specimen undergoing manufacturing.

5. The method of claim 1, wherein updating, by the computing system, the policy implemented by the reinforcement learning model comprises:
updating the policy based on a comparison between the expected reward and the generated reward.

6. The method of claim 1, wherein determining, by the computing system using the reinforcement learning model, the change to the manufacturing parameter to correct the error based on the policy comprises:
determining a plurality of corrective actions to be performed to the specimen to correct the error based on the policy.

7. The method of claim 1, further comprising:
deploying the reinforcement learning model in the manufacturing system once the reinforcement learning model obtains a threshold level of accuracy.

8. A non-transitory computer readable medium comprising one or more sequences of instructions, which, when executed by a processor, causes a computing system to perform operations comprising:
receiving, by the computing system, an image of a specimen at a processing node in a manufacturing process executed across a manufacturing system;

detecting, by the computing system, an error in the specimen based on the image of the specimen;

determining, by the computing system using a reinforcement learning model, a change to a manufacturing parameter to correct the error based on a policy;

determining, by the computing system, state information of the specimen, the state information comprising a current action performed on the specimen and a previous action performed by the specimen at an upstream processing node in the manufacturing process;

generating, by the computing system, a quality metric for the specimen based on the state information;

generating, by the computing system, a reward corresponding to the state information;

comparing, by the computing system, an expected reward corresponding to the state information to the generated reward;

determining, by the computing system, that there is a deviation between the reward and the expected reward that exceeds a threshold amount; and based on the determining, updating, by the computing system, the policy implemented by the reinforcement learning model.

9. The non-transitory computer readable medium of claim 8, further comprising:
prepending the state information of the specimen with a last action performed on the specimen.

10. The non-transitory computer readable medium of claim 8, wherein generating, by the computing system, the quality metric for the specimen based on the state information comprises:
determining a tensile strength of the specimen undergoing manufacturing.

11. The non-transitory computer readable medium of claim 10, wherein generating, by the computing system, the reward corresponding to the state information comprises:
optimizing the tensile strength of the specimen undergoing manufacturing.

12. The non-transitory computer readable medium of claim 8, wherein updating, by the computing system, the policy implemented by the reinforcement learning model comprises:
updating the policy based on a comparison between the expected reward and the generated reward.

13. The non-transitory computer readable medium of claim 8, wherein determining, by the computing system using the reinforcement learning model, the change to the manufacturing parameter to correct the error based on the policy comprises:
determining a plurality of corrective actions to be performed to the specimen to correct the error based on the policy.

14. The non-transitory computer readable medium of claim 8, further comprising:
deploying the reinforcement learning model in the manufacturing system once the reinforcement learning model obtains a threshold level of accuracy.

15. A system comprising:
a processor; and
a memory having programming instructions stored thereon, which, when executed by the processor, causes the system to perform operations comprising:
receiving an image of a specimen at a processing node in a manufacturing process;
detecting an error in the specimen based on the image of the specimen;
determining, using a reinforcement learning model, a change to a manufacturing parameter to correct the error based on a policy;
determining state information of the specimen, the state information comprising a current action performed on the specimen and a previous action performed by the specimen at an upstream processing node in the manufacturing process;
generating a quality metric for the specimen based on the state information;

generating a reward corresponding to the state information;

comparing an expected reward corresponding to the state information to the generated reward;

determining that there is a deviation between the reward and the expected reward that exceeds a threshold amount; and based on the determining, updating the policy implemented by the reinforcement learning model.

16. The system of claim 15, wherein the operations further comprise:

prepending the state information of the specimen with a last action performed on the specimen.

17. The system of claim 15, wherein generating the quality metric for the specimen based on the state information comprises:

determining a tensile strength of the specimen undergoing manufacturing.

18. The system of claim 17, wherein generating the reward corresponding to the state information comprises:

optimizing the tensile strength of the specimen undergoing manufacturing.

19. The system of claim 15, wherein updating the policy implemented by the reinforcement learning model comprises:

updating the policy based on a comparison between the expected reward and the generated reward.

20. The system of claim 15, wherein determining, using the reinforcement learning model, the change to the manufacturing parameter to correct the error based on the policy comprises:

determining a plurality of corrective actions to be performed to the specimen to correct the error based on the policy.

* * * * *